(12) United States Patent
Whelan et al.

(10) Patent No.: US 9,201,131 B2
(45) Date of Patent: Dec. 1, 2015

(54) SECURE ROUTING BASED ON DEGREE OF TRUST

(75) Inventors: David A. Whelan, Newport Coast, CA (US); Gregory M. Gutt, Ashburn, VA (US); David G. Lawrence, Santa Clara, CA (US); Michael Lee O'Connor, Redwood City, CA (US); Arun Ayyagari, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 22 days.

(21) Appl. No.: 13/366,098

(22) Filed: Feb. 3, 2012

(65) Prior Publication Data

US 2013/0019317 A1    Jan. 17, 2013

Related U.S. Application Data

(63) Continuation-in-part of application No. 12/949,404, filed on Nov. 18, 2010, now Pat. No. 9,009,796, and a continuation-in-part of application No. 13/283,491, filed on Oct. 27, 2011, now Pat. No. 8,949,941.

(51) Int. Cl.
*G06F 21/00* (2013.01)
*G01S 1/72* (2006.01)
(Continued)

(52) U.S. Cl.
CPC ............... *G01S 1/725* (2013.01); *G01S 19/42* (2013.01); *H04B 7/18593* (2013.01);
(Continued)

(58) Field of Classification Search
CPC ......... G04S 19/42; G04S 19/38; G04S 19/39; G04S 19/01; G04S 19/32; G04S 19/33; H04L 5/0069; H04L 12/5865; H04L 29/12981; H04L 51/20; H04L 9/08; G06F 2221/2111; G06F 2221/0708; G06F 21/06; H04W 4/02; H04W 40/20; H04W 48/02; H04W 48/04

USPC .......... 713/150–161, 164–186; 709/204–207, 709/217–244; 726/1–25, 26–30; 455/456.1–456.6, 12.1–13.4
See application file for complete search history.

(56) References Cited

U.S. PATENT DOCUMENTS 5,543,813 A * 8/1996 Araki et al. ................. 342/357.2
5,969,669 A * 10/1999 Ishikawa et al. ........... 342/357.2
(Continued)

FOREIGN PATENT DOCUMENTS

WO       03075125 A2    9/2003
WO    2006002458 A1    1/2006

OTHER PUBLICATIONS

Markovic, Zoran M. "Satellites in Non-Geostationary Orbits." Satellite Communications. Springer US, 1993. 345-391.*
(Continued)

*Primary Examiner* — Madhuri Herzog
(74) *Attorney, Agent, or Firm* — Vista IP Law Group LLP; Cynthia A. Dixon

(57) ABSTRACT

A system, method, and apparatus for secure routing based on a degree of trust are disclosed herein. The disclosed method involves assigning a level of trust to at least one network node, and utilizing the level of trust to determine a degree of security of the network node(s). The level of trust of the network node(s) is related to an amount of certainty of the physical location of the network node(s). The amount of certainty is attained from the network node(s) being located in a known secure location, and/or from verification of the physical location of the network node(s) by using satellite geolocation techniques or by using network ping ranging measurements. The method further involves utilizing the level of trust of the network node(s) to determine a degree of trust of at least one path for routing the data, where the path(s) includes at least one of the network nodes.

23 Claims, 16 Drawing Sheets

(51) Int. Cl.

| | | |
|---|---|---|
| *G01S 19/42* | (2010.01) | |
| *H04B 7/185* | (2006.01) | |
| *H04L 9/32* | (2006.01) | |
| *H04W 40/20* | (2009.01) | |
| *H04L 12/721* | (2013.01) | |
| *H04L 29/06* | (2006.01) | |
| *H04W 4/02* | (2009.01) | |

(52) U.S. Cl.
 CPC ........... *H04L 9/3236* (2013.01); *H04L 9/3239* (2013.01); *H04L 9/3297* (2013.01); *H04L 45/12* (2013.01); *H04L 45/26* (2013.01); *H04W 40/20* (2013.01); *G06F 2221/2111* (2013.01); *H04L 63/0428* (2013.01); *H04L 2209/805* (2013.01); *H04L 2209/84* (2013.01); *H04W 4/02* (2013.01)

(56) References Cited

U.S. PATENT DOCUMENTS

| | | | |
|---|---|---|---|
| 6,453,168 B1 * | 9/2002 | McCrady et al. | 455/517 |
| 7,042,392 B2 | 5/2006 | Whelan et al. | |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 7,733,804 B2 * | 6/2010 | Hardjono et al. | 370/254 |
| 7,865,717 B2 * | 1/2011 | Calcev et al. | 713/153 |
| 7,984,294 B1 * | 7/2011 | Goringe et al. | 713/166 |
| 8,156,539 B1 * | 4/2012 | Nelson | 726/2 |
| 2001/0002822 A1 * | 6/2001 | Watters et al. | 342/357.1 |
| 2003/0216143 A1 * | 11/2003 | Roese et al. | 455/456.1 |
| 2005/0159891 A1 | 7/2005 | Cohen et al. | |
| 2007/0028098 A1 * | 2/2007 | Baartman et al. | 713/162 |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2009/0171583 A1 * | 7/2009 | DiEsposti | 701/213 |
| 2009/0174597 A1 | 7/2009 | DeLellio et al. | |
| 2009/0228210 A1 | 9/2009 | Gutt | |
| 2009/0315764 A1 | 12/2009 | Cohen et al. | |
| 2009/0315769 A1 | 12/2009 | Whelan et al. | |
| 2010/0079333 A1 * | 4/2010 | Janky et al. | 342/357.02 |
| 2010/0171652 A1 | 7/2010 | Gutt et al. | |

OTHER PUBLICATIONS

International Search Report, PCT/US2013/020554, Mar. 19, 2013.
PCT Written Opinion of the International Search Authority, PCT/US2013/020554, Mar. 19, 2013.
Wang, et al., "A Routing Protocol Based on Trust for MANETs", Jan. 1, 2005, Grid and Cooperative Computing—GCC 2005 Lecture Notes in Computer Science; LNCS, Springer, Berlin, DE, pp. 959-064, XP019024872, ISBN: 978-3-540-30510-1, abstract, section 1, section 2.
Written Opinion of the International Searching Authority, PCT/US2013/020554, Aug. 14, 2014.

* cited by examiner

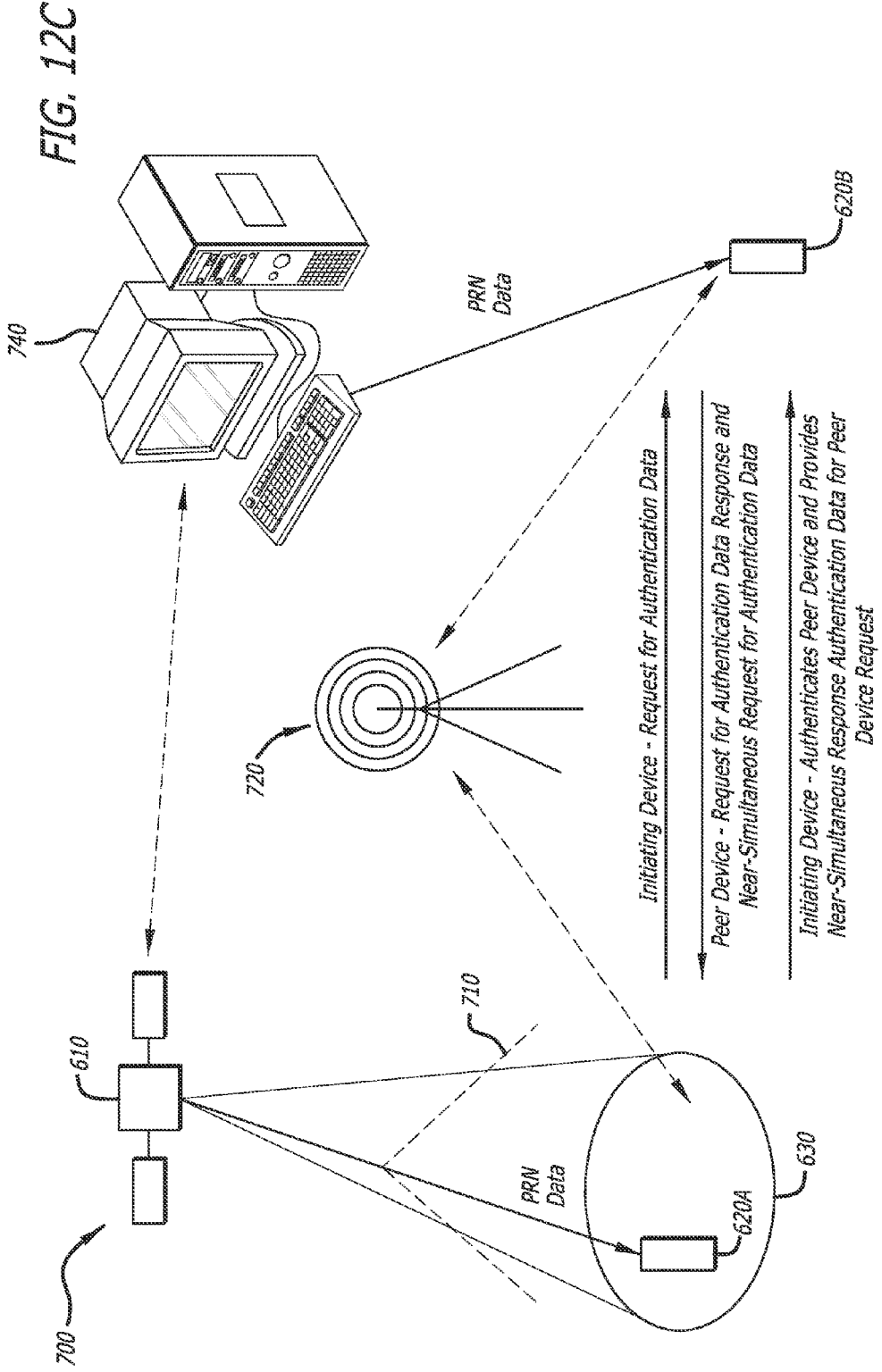

SECURE ROUTING BASED ON DEGREE OF TRUST

CROSS-REFERENCE TO RELATED APPLICATIONS

This application is a Continuation-In-Part application of, and claims priority to and the benefit of U.S. patent application Ser. No. 12/949,404, filed Nov. 18, 2010, entitled "Spot Beam Based Authentication". This application is a Continuation-In-Part application of, and claims priority to and the benefit of U.S. patent application Ser. No. 13/283,491, filed Oct. 27, 2011, entitled "Geothentication Based on Network Ranging". The contents of both of these applications are hereby incorporated by reference in their entirety.

BACKGROUND

The present disclosure relates to secure routing. In particular, it relates to secure routing based on a degree of trust.

SUMMARY

The present disclosure relates to a method, system, and apparatus for secure routing based on a degree of trust. In particular, the present disclosure teaches a method to improve routing security involving assigning at least one level of trust to at least one network node. The method further involves utilizing at least one level of trust to determine a degree of security of the network node(s).

In at least one embodiment, at least one network node is a router, a server, a personal computing device, a personal digital assistant (PDA), a cellular phone, a computer node, an internet protocol (IP) node, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node.

In one or more embodiments, there is more than one level for the level of trust. In some embodiments, the level of trust(s) of at least one network node is very high, high, medium, and/or low. In at least one embodiment, at least one level of trust of at least one network node is related to an amount of certainty of the physical location of the network node(s). In some embodiments, the amount of certainty of the physical location of at least one network node is attained from the network node(s) being located in a known secure location.

In at least one embodiment, the amount of certainty of the physical location of at least one network node is attained from verification of the physical location of the network node(s) by using satellite geolocation techniques. In some embodiments, the satellite geolocation techniques use at least one authentication signal in order to obtain the physical location of the network node(s). In one or more embodiments, at least one authentication signal is transmitted by at least one transmission source, and is received by at least one receiving source associated with the network node(s). In some embodiments, at least one transmission source is employed in at least one satellite and/or at least one pseudo-satellite. In at least one embodiment, at least one satellite is a Lower Earth Orbiting (LEO) satellite, a Medium Earth Orbiting (MEO) satellite, and/or a Geosynchronous Earth Orbiting (GEO) satellite. In some embodiments, the LEO satellite is an Iridium LEO satellite.

In one or more embodiments, the disclosed method employs an Iridium LEO satellite constellation. In at least one embodiment, each of the Iridium LEO satellites in the constellation has an antenna geometry that transmits forty-eight (48) spot beams with a distinctive spot beam pattern. In at least one embodiment, at least one authentication signal may be transmitted from at least one of the Iridium satellites in the constellation. The forty-eight (48) spot beams of an Iridium satellite may be used to transmit localized authentication signals to receiving sources located on or near the Earth's surface. The broadcasted message burst content associated with these signals includes pseudorandom noise (PRN) data. Since a given message burst may occur within a specific satellite spot beam at a specific time, the message burst content including PRN and unique beam parameters (e.g., time, satellite identification (ID), beam identification (ID), time bias, orbit data, etc.) may be used to authenticate the location of the target node(s). It should be noted that when employing one of the above-described Iridium LEO satellites, the transmission signal power is sufficiently strong enough to allow for the authentication signal to penetrate into an indoor environment reliably, and may employ signal encoding methods in order to do so. This allows for these geolocation techniques to be used for many indoor applications. It should be further noted that this system could employ at least one next generation Iridium satellite, or a combination of existing Iridium satellites with the next generation Iridium satellite configuration.

In at least one embodiment, the amount of certainty of the physical location of at least one network node is attained from estimating the physical location of the network node(s) by using network ping ranging measurements. In some embodiments, the network ping ranging measurements are obtained from an amount of time lapsed during pings or ping-like messages being sent back and forth from at least one verified node (also referred to as the trusted node(s)) with a verified physical location to the network node(s) (also referred to as the target node(s)). In one or more embodiments, at least one verified node (i.e. trusted node) with a verified physical location has its physical location verified by satellite geolocation techniques.

In one or more embodiments, the method further involves utilizing at least one level of trust of at least one network node to determine a degree of trust of at least one path for routing the data, where the path(s) includes at least one of the network nodes. In one or more embodiments, there is more than one level for the degree of trust. In at least one embodiment, the degree of trust of at least one path is very high, high, medium, or low. In some embodiments, the degree of trust of at least one path is equal to the lowest level of trust assigned to at least one of the network nodes in the path(s). In other embodiments, the degree of trust of at least one path is equal to the aggregate level of trust of the network nodes along the path. In one or more embodiments, the method also involves choosing which one of the paths to route the data through according to the degree of trust of the paths.

In at least one embodiment, the method further involves encrypting, with at least one processor, the data. Also, the method involves transmitting, with at least one of the network nodes, the encrypted data. In addition, the method involves receiving, with at least one of the network nodes, the encrypted data. Additionally, the method involves decrypting, with at least one processor, the encrypted data. This technique of transmitting, by at least one network node, encrypted data, and receiving, by another at least one network node, encrypted data is referred to as "encrypted tunneling".

This technique allows for network nodes to securely transmit and receive data with a higher degree of trust across a path with a lower degree of trust.

In at least one embodiment, at least one processor is employed in a router, a server, a personal computing device, a personal digital assistant (PDA), a cellular phone, a computer node, an internet protocol (IP) node, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node.

In one or more embodiments, the method further involves utilizing, by at least one of the network nodes, at least one secure router to transmit the data. In at least one embodiment, the method further involves utilizing, by at least one of the network nodes, at least one secure router to receive the data.

In at least one embodiment, the method further involves assigning a degree of trust to the data. In some embodiments, the method further involves utilizing, by at least one of the network node(s), at least one boundary firewall router to determine whether the data is allowed through the boundary firewall router(s) based on the degree of trust of the path that the data has traveled through. In at least one embodiment, at least one of the paths includes at least one secure autonomous system for routing the data through. In at least one embodiment, at least one secure autonomous system has an overall level of trust assigned to it.

In some embodiments, the method further involves generating, with at least one processor, a mapping of the physical location of at least one network node, where the mapping indicates at least one level of trust for each of the network nodes.

In one or more embodiments, at least one level of trust of at least one network node is related to the behavior of the at least one network node. In at least one embodiment, the behavior of at least one network node is related to the type of data passing through the network node(s) and/or the quantity of the data passing through the network node(s).

In one or more embodiments, a disclosed system to improve routing security involves at least one network node, and at least one processor configured to assign at least one level of trust to the network node(s). At least one processor is configured to utilize at least one level of trust to determine a degree of security of the network node(s).

In at least one embodiment, at least one processor is further configured to utilize at least one level of trust of at least one network node to determine a degree of trust of at least one path for routing the data, where the path(s) includes at least one of the network nodes. In some embodiments, at least one processor is further configured to choose which one of the paths to route data through according to the degree of trust of the paths. In some embodiments, at least one processor is further configured to use at least one level of trust, for at least one network node, to choose which one of the paths to route the data through.

In one or more embodiments, at least one processor is further configured to encrypt the data. In at least one embodiment, at least one network node is configured to transmit the encrypted data. In some embodiments, at least one network node is configured to receive the encrypted data. In one or more embodiments, at least one processor is further configured to decrypt the encrypted data.

In at least one embodiment, the system further involves at least one secure router, and at least one of the network nodes is further configured to utilize the secure router(s) to transmit the data. In some embodiments, the system further involves at least one secure router, and at least one of the network nodes is further configured to utilize the secure router(s) to receive the data. In at least one embodiment, at least one processor is further configured to assign a degree of trust to the data.

In one or more embodiments, the system further involves at least one boundary firewall router configured to determine whether to allow the data through the boundary firewall router(s) based on the degree of trust of the path that the data has traveled through. In at least one embodiment, the system further involves at least one secure autonomous system configured to route the data through, where at least one of the paths includes at least one of the secure autonomous system(s).

In at least one embodiment, at least one processor is further configured to generate a mapping of the physical location of at least one network node, where the mapping indicates at least one level of trust for each of the network nodes.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIGS. 6 through 10 are directed towards the disclosed system and method for geothentication based on network ranging for network nodes.

FIG. 6 is a schematic diagram of the disclosed system for authenticating the physical location of a target node, in accordance with at least one embodiment of the present disclosure.

FIG. 8 is a schematic diagram of two network routers each employing a response message hardware device for sending messages, in accordance with at least one embodiment of the present disclosure.

FIG. 9 is a schematic diagram of a response message hardware device attached to a router showing the device being placed in-line with the incoming data line, in accordance with at least one embodiment of the present disclosure.

Figure 10C:
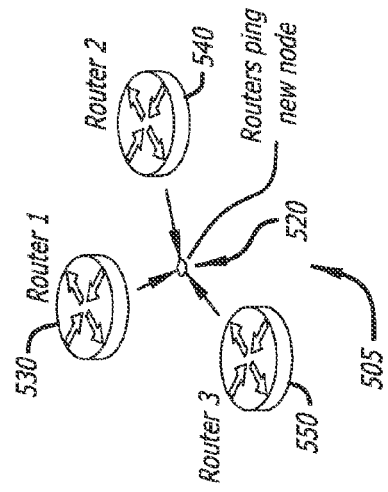
Figure 10B:
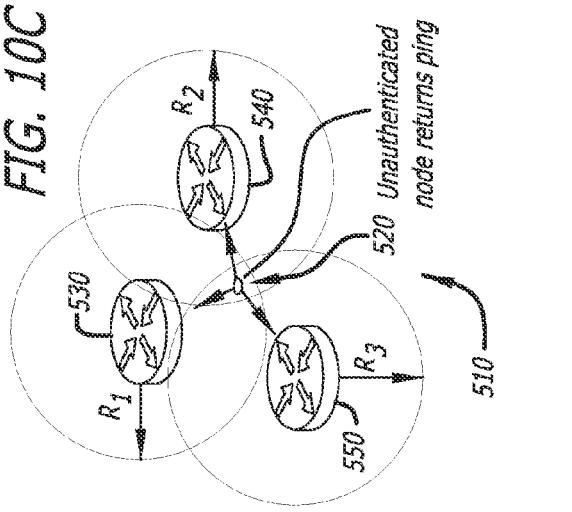
Figure 10A:
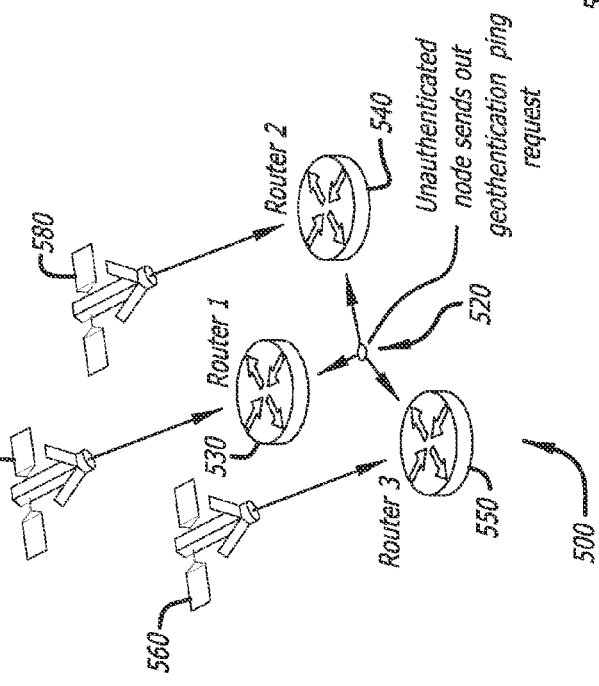

FIGS. 10A, 10B, and 10C are schematic diagrams, when viewed together, depicting a new node (e.g., a target node) entering the network and having its physical location authenticated by the disclosed system, in accordance with at least one embodiment of the present disclosure.

FIGS. 11 through 14 are directed towards the disclosed system and method for spot beam based authentication of network nodes.

Figure 11:
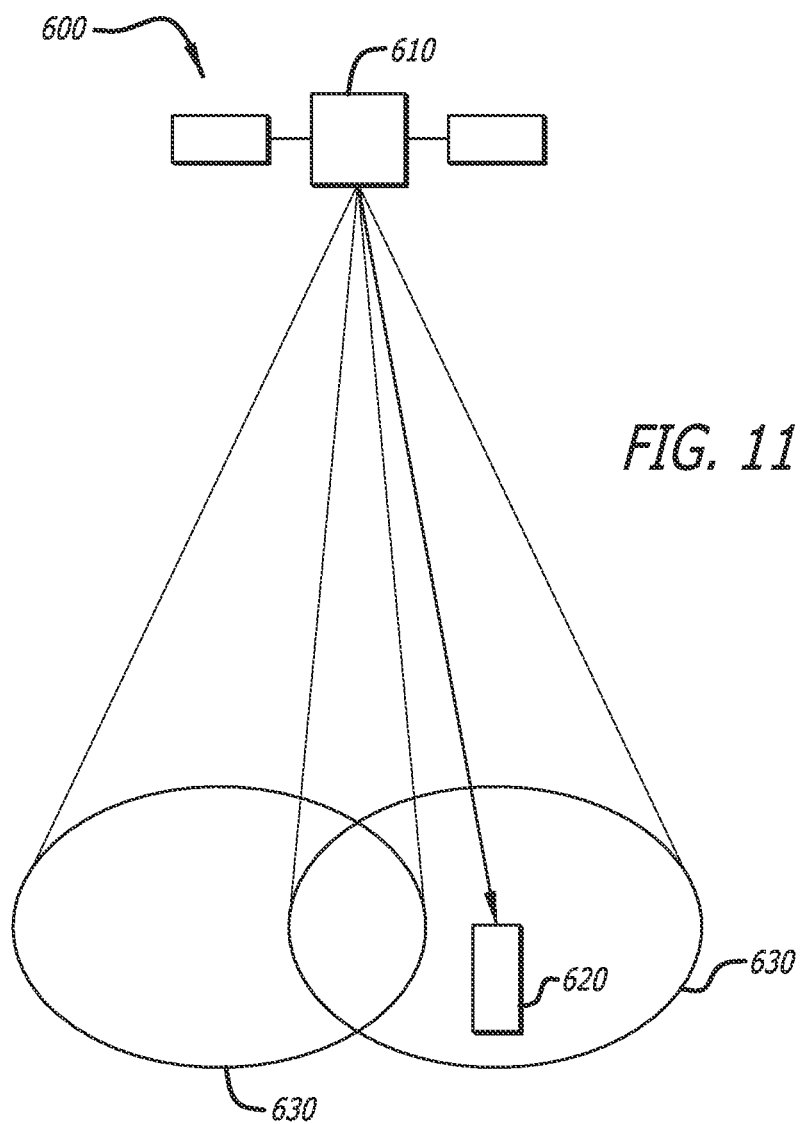

FIG. 11 is a schematic diagram of a satellite-based communication system that may be employed by the disclosed spot beam based authentication system, in accordance with at least one embodiment of the present disclosure.

Figure 12A:
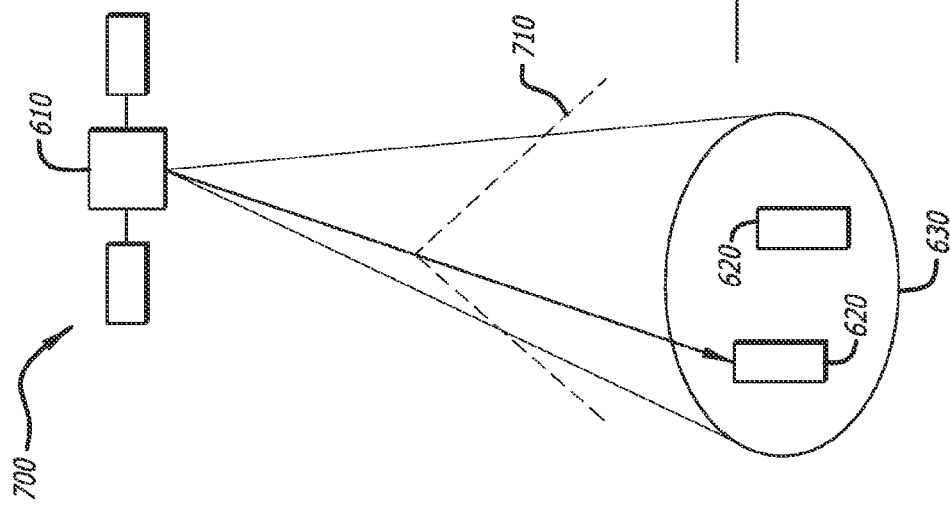
Figure 12A:
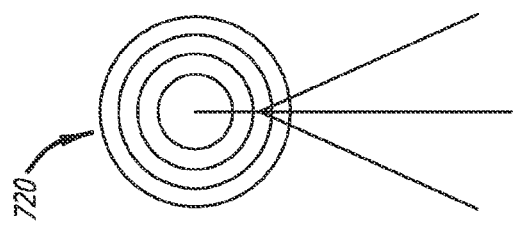
Figure 12A:
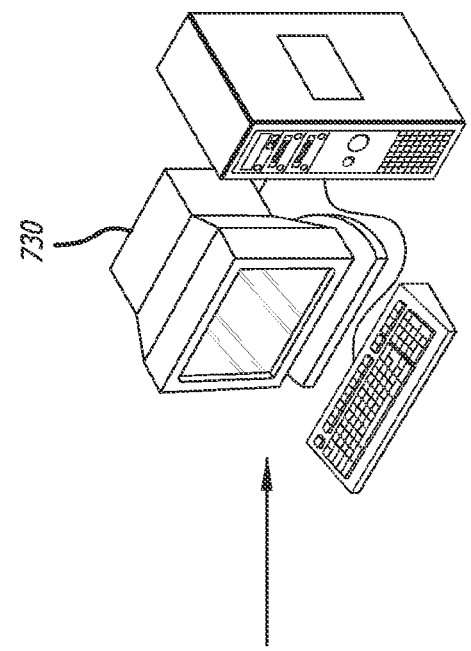
Figure 12B:
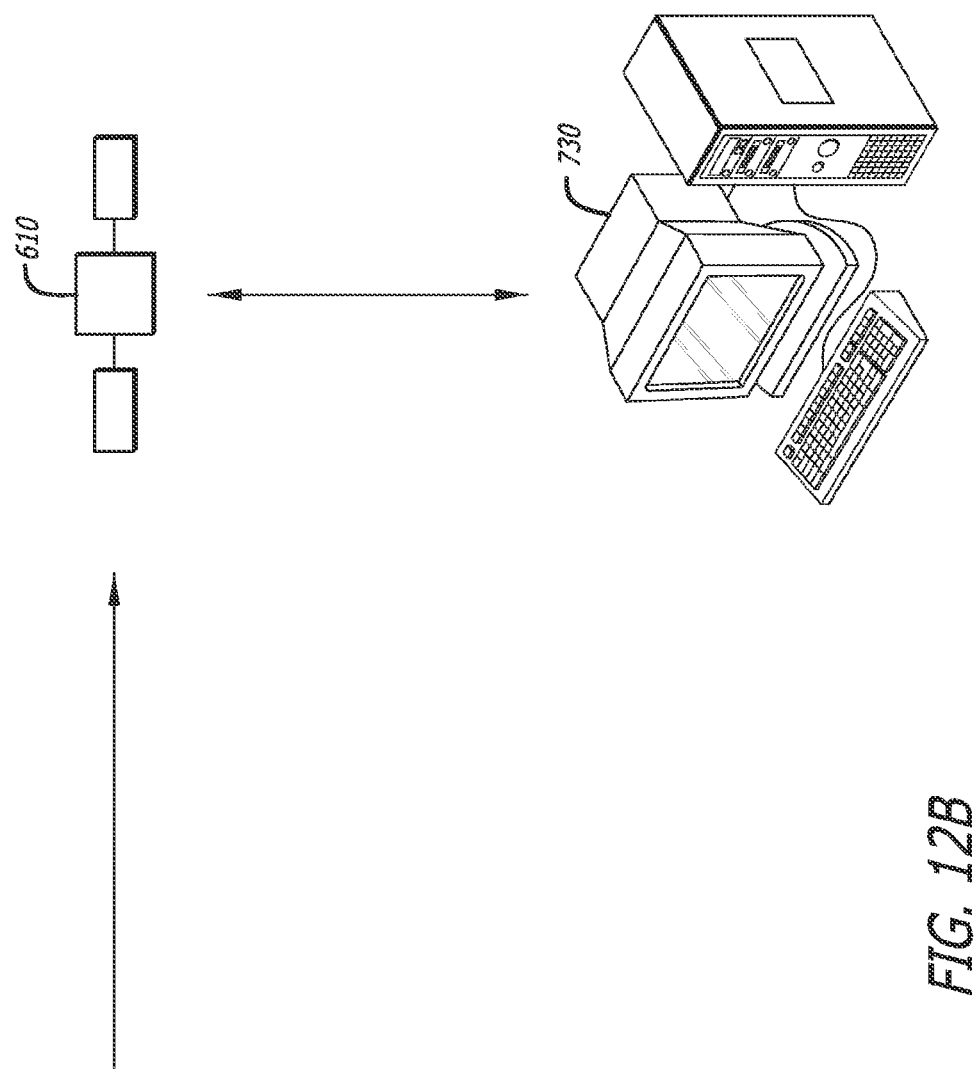

FIGS. 12A, 12B, and 12C are schematic diagrams illustrating satellite-based authentications systems, in accordance with at least one embodiment of the present disclosure.

Figure 13A:
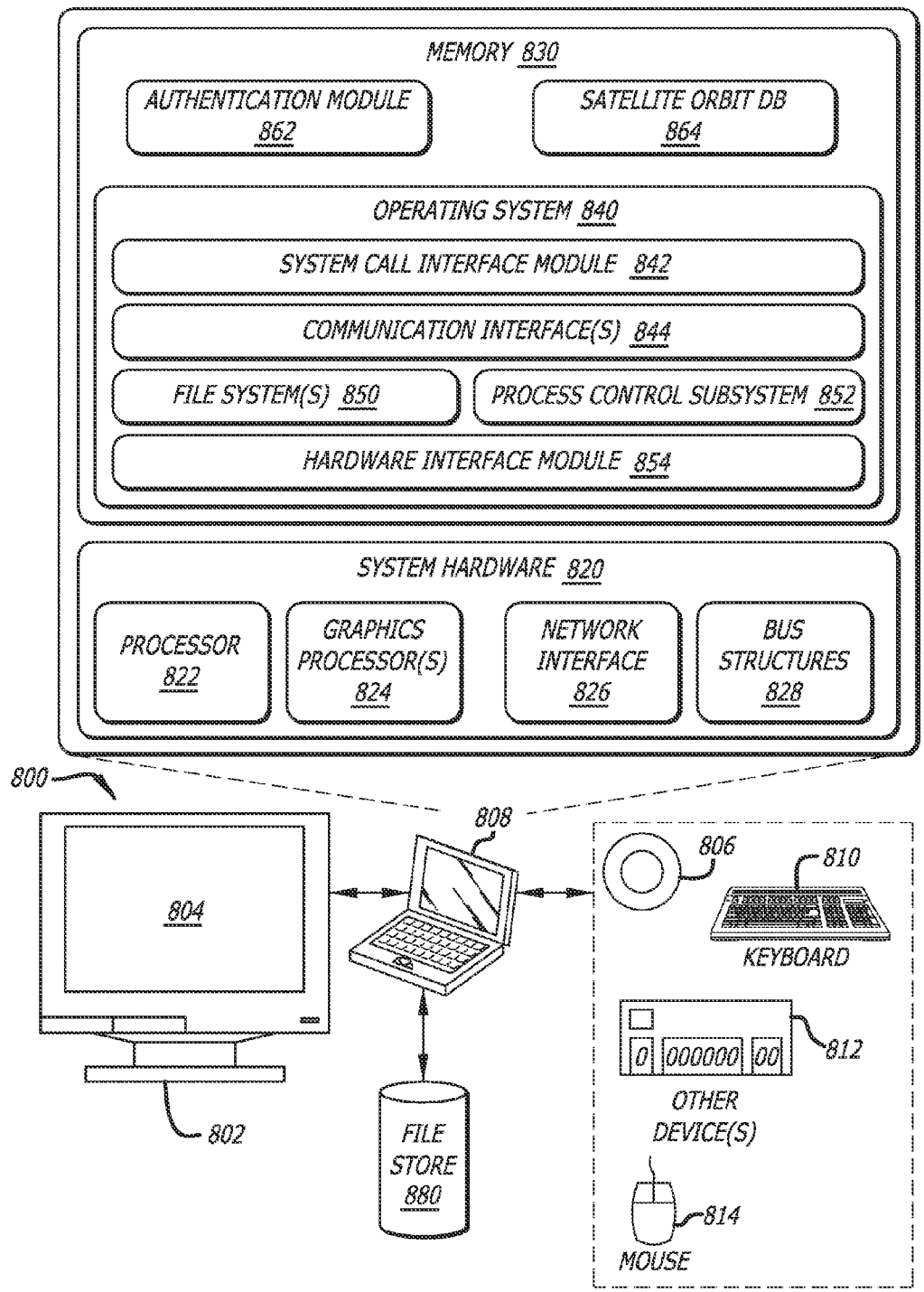

FIG. 13A is a schematic diagram of a computing device which may be adapted to implement the disclosed satellite-based authentication system, in accordance with at least one embodiment of the present disclosure.

Figure 13B:
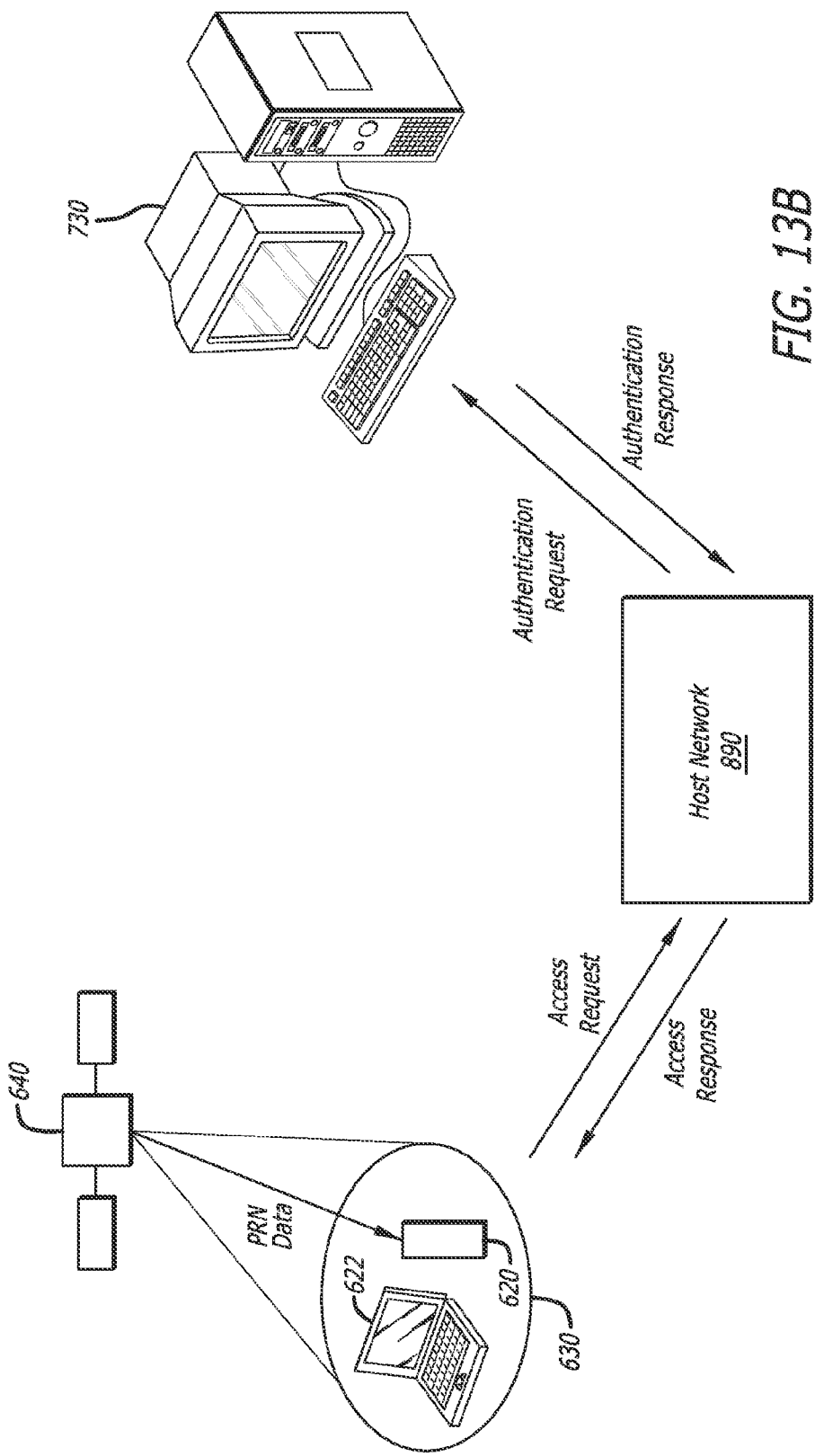

FIG. 13B is a schematic diagram of a satellite-based communication system that may be employed by the disclosed spot beam based authentication system, in accordance with at least one embodiment of the present disclosure.

Figure 14:
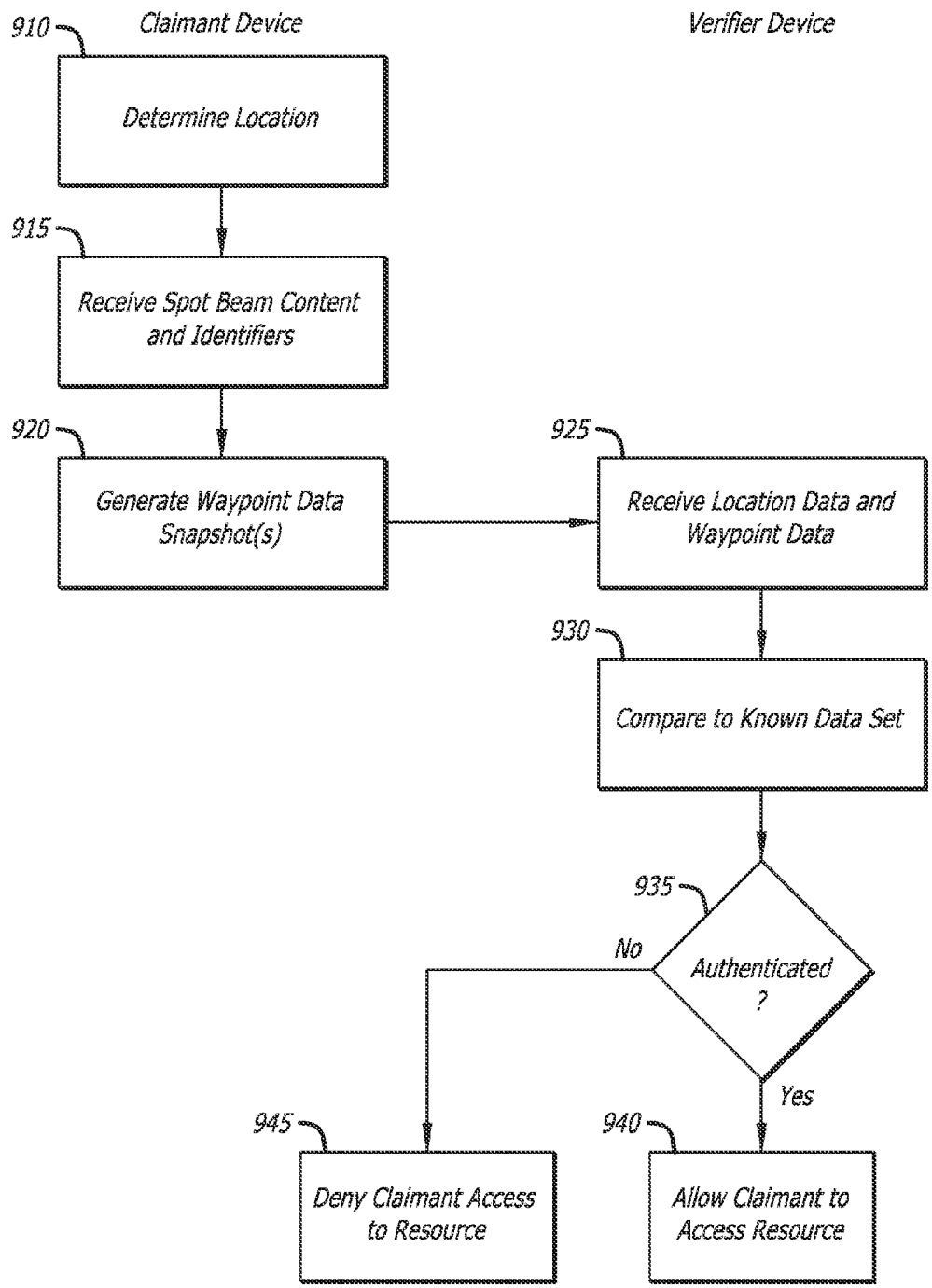

FIG. 14 is a flow diagram showing the disclosed spot beam based authentication method to authenticate a target node, in accordance with at least one embodiment of the present disclosure.

DESCRIPTION

The methods and apparatus disclosed herein provide an operative system for secure routing based on a degree of trust. In particular, the system relates to assigning a level of trust to at least one network node, and utilizing the level of trust to determine a degree of security of the network node(s). The level of trust of the network node(s) is related to an amount of certainty of the physical location of the network node(s). The amount of certainty of the physical location of at least one network node is attained from the network node(s) being located in a known secure location, and/or from verification of the physical location of the network node(s) by using satellite geolocation techniques or by using network ping ranging measurements. In one or more embodiments, the satellite geolocation techniques utilize the Iridium constellation of low Earth orbiting (LEO) satellites. In at least one embodiment, the system utilizes the level of trust of the participating network nodes to determine a degree of trust of at least one path for routing the data, where the path(s) includes at least one of the participating network nodes.

Currently, cyber-security is becoming increasingly important as electronic systems become more engrained into everyday business and social tasks. Many previously managed business processes have expanded into electronic data processing online, thereby making on-going information and computing security advancement techniques a necessary requirement in order to protect these everyday systems. Critical documents and other data using information from social security numbers to national infrastructure related information are stored in networked systems that, if accessed by an unauthorized party, would have varying degrees of societal impact from nuisances to catastrophic societal infrastructure breakdown. In parallel with increased reliance on electronic systems, the nation has also seen a dramatic increase in terrorism and computer hacking, thus requiring society to work towards improving methods to protect our networked computer systems.

Cyber attacks and network penetrations are becoming all too common, which has brought discussions of the dangers of network penetrations by external threats in both commercial and military environments to the forefront. Current access control approaches are principally based on either static passwords, or authentication based on password and/or badge credentials. As system attacks are often conducted by impersonating the end user (or network node or router), there has been a tendency for organizations to focus on user authentication methods to curtail network data interception network vulnerabilities. These approaches continue to be vulnerable to sophisticated attacks and, thus, a need has developed for a new paradigm of access control leveraging additional information, such as user location (or network node or router location), to provide an additional and orthogonal layer of protection, which provides enhanced correlation between location and contextual awareness from integrated physical geolocation to logical network and information management views.

Furthermore, the fact that existing cyber attacks are often shrouded in anonymity has created additional concerning problems. Larger attacks are often preluded by attempts by the originator taking smaller steps to better understand the system's vulnerabilities for future exploitation and laying the groundwork for a later, more destructive attack. To date, many large scale cyber attacks have not only left the recipients of the attacks recovering from the damage left behind, but they are also unable to deter any further damage through retaliation or otherwise as without clear traceability to the attack's originator and, thus, often lack the authority to respond. If attack motives are unclear, it is further unlikely that the recipient could tell if the attack was a mere act of vandalism, purposeful theft, or a more sinister approach to threaten national security. As such, any system that would aid in denying network access to rogue users and/or provide traceable data to aid in identifying the originator would have great utility to reduce and mitigate denial of service (DoS) and network data interception attacks.

In order to improve security of a network, the system must be considered from both the nodal level and system perspective. Each node and subsequent pathways between the nodes contain opportunities for being compromised. The present disclosure focuses on improving the security of the network from a bottoms-up (i.e. node to system) approach. As such, the disclosed system and method focus on the security of the nodes and the security of the pathways between at least two nodes.

The disclosed system and method have at least six main features that are related to improving the security of a network. The first feature is related to assignment of a level of trust and/or a degree of trust. In particular, this feature is based on the ability to characterize, and further improve, the level of trust of a network node as well as the degree of trust for a network path that includes at least two network nodes. The level of trust for a network node may be determined by its certainty of physical location. The physical location of a node may be attained by placing the node in a known secure location, such as a military base or a government building; by verification of the physical location by using satellite geolocation techniques; or by estimation of the physical location by using network ping ranging measurements. The associated level of trust for a particular network node may be dependent on the type of authentication the node is able to perform to validate its physical location. For example, a node that is able to perform an authentication method with characteristics that reduce the likelihood of a node being hacked/spoofed or otherwise compromised, will inherently be given a higher level of associated trust with respect to another node that can only perform an authentication method that is less reliable than the former.

The degree of trust for a network path may be determined by the lowest level of trust found in its nodes. In addition, it should be noted that alternative methods may be used to define degrees of trust based on such attributes of a node including weighing the certainty of the location along with other aspects, such as the likelihood/probability that a given node has been compromised (i.e. some network nodes may be more inherently tolerant to hacking/spoofing attempts or otherwise alternatively more susceptible). For example, an end node may pose more significant risks to a network cloud and, thus, may be weighed such that it is inherently less trustworthy.

The second main feature of the disclosed system and method relates to encrypted tunneling. Encrypted tunneling allows for two network nodes, which have a higher degree of trust, to be able to send data securely to one another via a network path with a lower degree of trust. In at least one example, this may occur when the two network nodes require at least one additional network node to route data between them, where for example, the at least one additional network node has a lower degree of trust. For this feature, the originating transmission network node with the data to send, first encrypts the data prior to transmission. After the data is encrypted, the originating transmission network node sends the encrypted data via the path with the lower degree of trust to the destination receiving network node. Once the destination receiving network node receives the encrypted data, the destination receiving network node decrypts the encrypted data. However, in at least one embodiment, data may be routed though a chain of nodes, where at least one node has a lower level of trust and the remainder of the nodes have acceptable levels of trust. In this embodiment, the data may be decrypted once it is received by a node with an acceptable level of trust. In at least one embodiment, this may not be the destination receiving node, but rather a node prior in the chain (i.e. path) to the destination receiving node.

Figure 3:
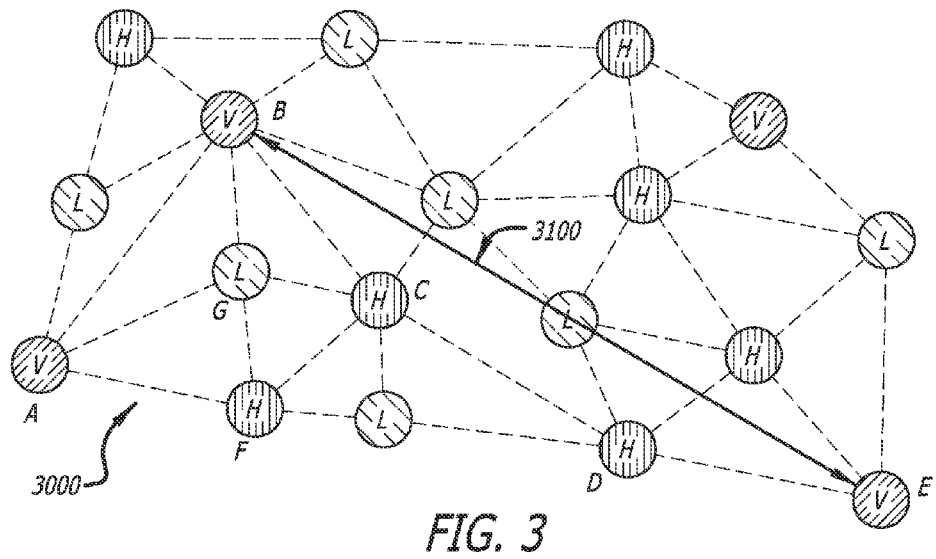
FIG. 3 is a schematic diagram illustrating the disclosed feature of encrypted tunneling, in accordance with at least one embodiment of the present disclosure.

In one or more embodiments, the second feature uses routers, or associated hardware, employed by the network nodes for routing of data. For this feature, the routers, or associated hardware, determine a path, which may employ at least one encrypted tunnel, to route the data through to maintain a higher degree of trust. For example, originating transmission network node E may be assigned to form a secure connection with a high degree of trust between itself and destination receiving network node A. For this example, network path E (high level of trust)—D (medium level of trust)—C (medium level of trust)—B (high level of trust)—A (high level of trust) is identified as the most secure path between network node E and network node A. However, there are network nodes with a medium level of trust that lie along this path. Since both network node D and network node C have a medium level of trust, network node E will route the data through an encrypted tunnel that is formed between itself and network node B. As such, the most direct (i.e. shortest) tunnel that can be created for this particular path while maintaining a high degree of trust is an encrypted tunnel between network node E and network node B. Thus, the resulting network path for the data to travel will be E (high level of trust)—encrypted tunnel—B (high level of trust)—A (high level of trust). FIG. 3 illustrates this particular feature.

The third main feature of the disclosed system relates to the use of secure routers. This feature allows for network nodes to use secure routers, which have a higher level of trust than the network nodes, to transmit and/or receive data. Since this feature is employed by network nodes that have a lower level of trust than the secure routers, this feature allows for network nodes with a lower level of trust to be able to securely transmit data and/or receive data with a higher degree of trust. It should be noted that for this feature, both the originating transmission network node and the destination receiving network node may utilize secure routers or, conversely, only one network node, either the originating transmission node or the destination network node, may utilize a secure router.

The fourth main feature of the disclosed system and method relates to the use of at least one boundary firewall router. For this feature, at least one boundary firewall router is employed as a gatekeeper to data attempting to pass through the network. Specifically, a boundary firewall router is used to determine whether to allow data to pass through the boundary firewall router. In particular, the boundary firewall router will let data pass through it if the data has previously passed through a path with a high enough degree of trust. As such, each boundary firewall router will have a set threshold degree of trust that it will require the data's path to have in order for it to allow the data to pass through. In some embodiments, the system and method use at least one boundary firewall router as a gatekeeper to data traffic attempting to cross from a public network to a private network, which requires incoming data to have traveled through a path with a higher degree of trust. The description of FIG. 5 describes in detail the feature of using boundary firewall routers.

The fifth main feature of the disclosed system and method relates to minimum level of trust routing aided by associated hardware. This feature uses routers, or associated hardware, employed by the network nodes to achieve minimum level of trust routing of data. The routers, or associated hardware, are used by the network nodes to report the minimum level of trust of the network nodes that lie in a particular path between one end point network node and another end point network node. This feature allows for the network nodes to be able to recursively probe along a particular network path to determine the path's overall degree of trust. For this feature, a path's degree of trust is equal to the lowest level of trust of any network node that lies within that path.

For example, for the network path of network nodes: A (high level of trust)—B (high level of trust)—C (high level of trust)—D (medium level of trust), network node A may request of network node B what the level of trust is between network node B and network node D. Network node B could then ask network node C what the level of trust is between network node C and network node D. Since network node C is connected to network node D and the level of trust for network node D is medium, network node C reports back to network node B that the minimum level of trust is medium. Network node B may have a high level of trust, but now knows that the downstream minimum level of trust is medium, so it may report that the minimum level of trust along network path B-C-D is medium. Network node A in this example also has a high level of trust, and it knows that the minimum level of trust along A-B-C-D is not to its level of trust, but rather it is associated with the downstream minimum level of trust, which is medium.

The sixth feature of the disclosed system and method relates to the use of autonomous systems. For this feature, at least one autonomous system is used to route data through. Each autonomous system has its own level of trust. If an autonomous system has an acceptable level of trust (i.e. a high enough level of trust) that is required for the routing of the data, the data may be routed through the autonomous system if the autonomous system lies in between the originating transmitting network node and the destination receiving network node. The description of FIG. 4 describes in detail the feature of using an autonomous system.

In one or more embodiments, the level of trust for an autonomous system may be defined as being equal to the lowest level of trust of any network node (or router) that lies within that the autonomous system. For example, if an autonomous system includes network nodes with a high level of trust and network nodes with a medium level of trust, the level of trust for that autonomous system would be medium. In other embodiments, if the autonomous system is able to form a path, which may or may not include encrypted tunnels, through its network nodes (or routers) that have a higher level of trust, the level of trust for the autonomous system may be defined as being equal to that higher level of trust. For example, if an autonomous system includes network nodes with a high level of trust and network nodes with a medium level of trust, and is able to form a path, including or not including encrypted tunnels, between its network nodes with a high level of trust, then the level of trust for the autonomous system will be high.

The eighth main feature of the disclosed system and method relates to indoor signal reception. This feature is applicable when the disclosed system and method employ at least one Iridium lower earth orbiting (LEO) satellite as a transmission source to transmit at least one authentication signal to Earth to be used by satellite geolocation techniques in order to verify the location of at least one network node (or router). As briefly mentioned above, signals transmitted from Iridium LEO satellites are able to penetrate into indoor environments. As such, the use of Iridium LEO satellites allows for the verification of the physical location of network nodes that are located indoors. Therefore, this feature allows for the disclosed system and method to be used for various indoor applications.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
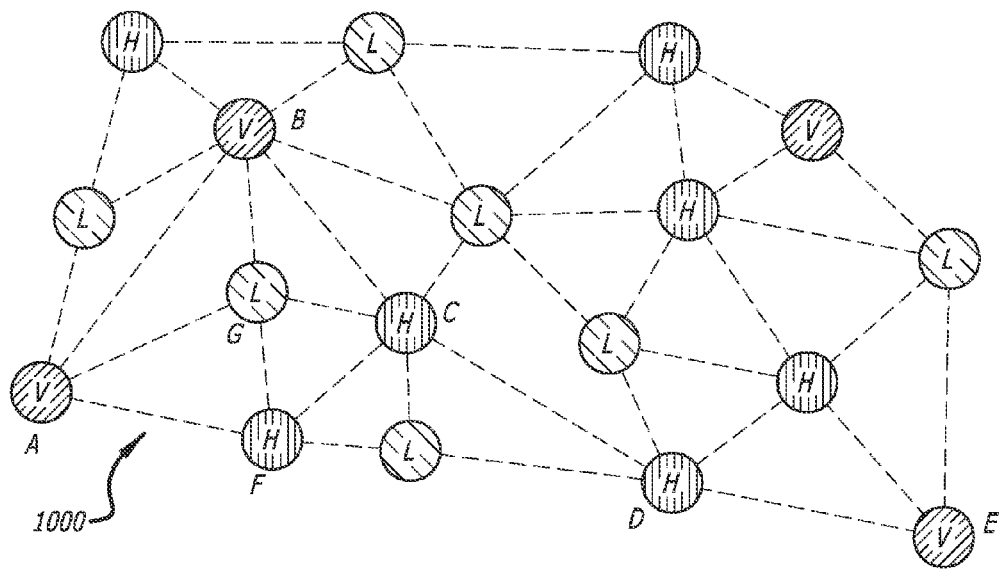
FIG. 1 depicts a schematic diagram of a notional network of network nodes that have been assigned varying levels of trust, in accordance with at least one embodiment of the present disclosure.

FIG. 1 depicts a schematic diagram of a notional network 1000 of network nodes that have been assigned varying levels of trust, in accordance with at least one embodiment of the present disclosure. In this figure, the network 1000 of network nodes is shown to include network nodes A, B, C, D, E, F, and G, as well as other additional network nodes. Each of the network nodes in the network 1000 is assigned a level of trust. For FIG. 1, the network nodes have been assigned one of three levels of trust, which are a very high level of trust (denoted by the letter "V"), a high level of trust (denoted by the letter "H"), and a low level of trust (denoted by the letter "L"). As such, as is shown in the figure, network nodes A, B, and E have been assigned a very high level of trust; network nodes C, D, and F have been assigned a high level of trust; and network node G has been assigned a low level of trust.

It should be noted that in some embodiments, the disclosed system and method may employ more than three levels of trust or less than three levels of trust. In addition, in some embodiments, the levels of trust may have various different names than the ones used in the present disclosure. For example, in some embodiments, the disclosed system and method employ four levels of trust. In at least one embodiment, the four levels of trust are called a very high level of trust, a high level of trust, a medium level of trust, and a low level of trust.

The disclosed system and method utilizes various means or ways to determine which particular level of trust to assign to a network node. In one or more embodiments, the amount of certainty of the physical location of a network node is a factor, or indicator, for determining which level of trust to assign to a network node. There are various ways the physical location of a network node can be verified or estimated, and the way the physical location is verified or estimated can be used as an indicator, or factor, in determining the level of trust that should be assigned to a network node.

For example, one way the physical location of a network node can be verified is if the network node is located in a known secure location, such as a military base or government building. In one or more embodiments, network nodes that are in a known physical location are assigned a very high level of trust.

Another way the physical location of a network node can be verified is by using satellite geolocation techniques. Different types of satellite geolocation techniques may be employed by the disclosed system. The Spot Beam Based Authentication section of the present disclosure, which includes the description of FIGS. 11 through 14, discusses one example satellite geolocation technique (i.e. spot beam based authentication) that may be utilized by the disclosed system. In addition, the description of FIG. 2 describes how the disclosed system and method use the spot beam based authentication satellite geolocation technique to verify the physical location of network nodes. In at least one embodiment, network nodes that have their physical locations verified by satellite geolocation techniques are assigned a very high level of trust.

An example way that the physical location of a network node can be estimated is by using network ping ranging measurements. Various types of network ranging measurements and techniques may be used by the disclosed system. The Geothentication Based on Network Ranging section of the present disclosure, which includes the description of FIGS. 6-10, describes in detail one exemplary network ranging technique that may be employed by the disclosed system.

When the disclosed system and method utilize the geothentication based on network ranging technique to estimate the physical location of a network node (referred to as a target node), in one or more embodiments, a node (referred to as a verified node) that has its physical location verified (and is thus "trusted") first sends an inquiry ping or ping-like message to the network node (i.e. the target node) that needs its physical location verified. In one or more embodiments, the verified node has its physical location verified by satellite geolocation techniques, such as the spot beam based authentication technique. Once the network node receives the inquiry message, the network node sends a response ping or ping-like message back to the verified node (i.e. the trusted node). The amount of time lapsed from the verified node sending the inquiry message to the verified node receiving the response message is used to generate ranging measurements. The ranging measurements are utilized to calculate an estimate of the physical location of the network node (i.e. the target node). In one or more embodiments, network nodes that have their physical locations estimated by satellite network ping ranging measurements may be assigned a high level of trust.

It should be noted that some network nodes will not be able to have their physical location verified methods described such as by being located in a known secure location or by satellite geolocation techniques, and will not be able to have their physical location estimated by network ping ranging measurements. In one or more embodiments, these network nodes may be assigned a low level of trust.

Referring back to FIG. 1, in this figure, as previously mentioned, the network nodes are assigned various different levels of trust as indicated on the figure. When a network node (i.e. an originating transmission network node) wants to send data to another network node (i.e. a destination receiving network node), a particular path that stretches between the two network nodes for sending the data must be determined. Similar to the network nodes, each path has a degree of trust. In one or more embodiments, the degree of trust for a network path may be determined by the lowest level of trust found in its nodes. For example, the network path of network nodes A (very high level of trust)—B (very high level of trust)—C (high level of trust)—D (high level of trust)—E (very high level of trust), will be given a high degree of trust because the lowest level of trust found in its nodes is high (i.e. for network nodes C and D).

Figure 2:
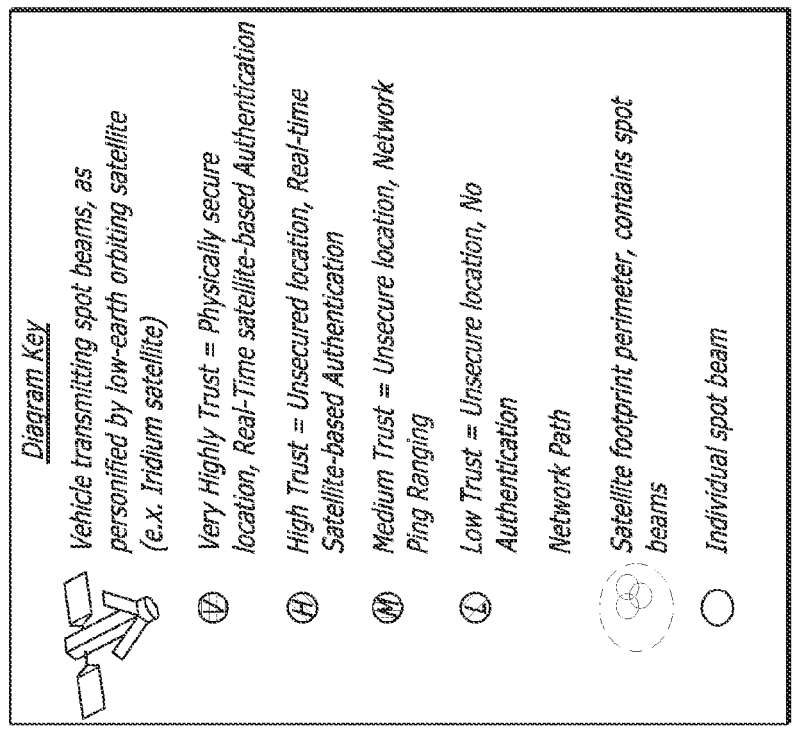
FIG. 2 is a schematic diagram of different network nodes having their physical locations verified by satellite geolocation techniques and by network ping ranging measurements, in accordance with at least one embodiment of the present disclosure.
Figure 2:
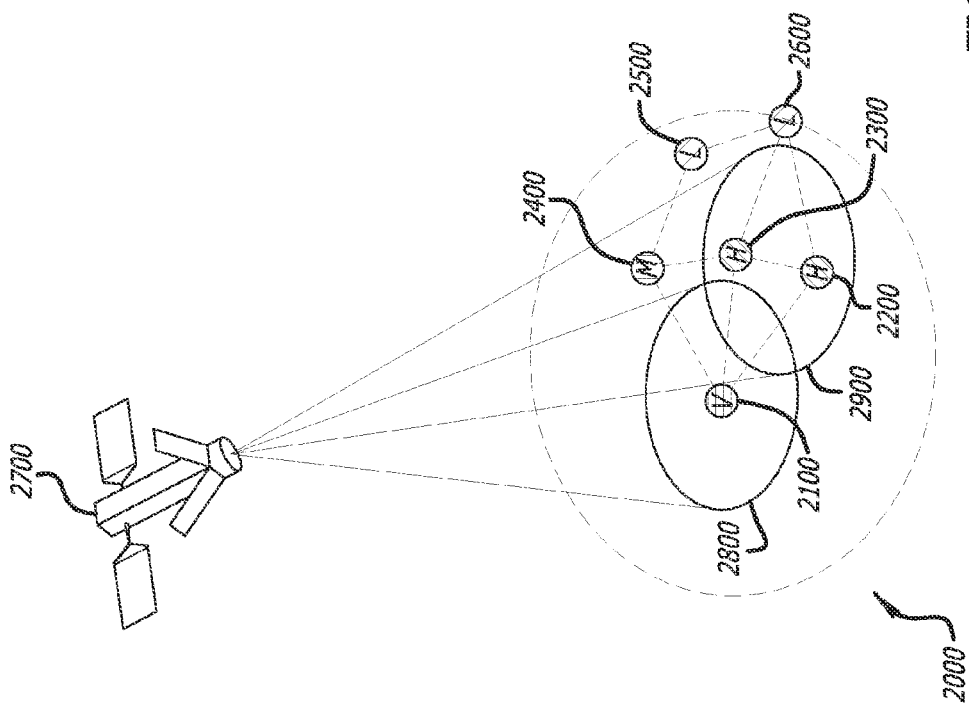

FIG. 2 is a schematic diagram 2000 of different network nodes having their physical locations verified by satellite geolocation techniques and by network ping ranging measurements, in accordance with at least one embodiment of the present disclosure. In this figure, a network containing five network nodes is shown. For this figure, the network nodes are assigned a very high level of trust (denoted by the letter "V") if they are located in a known secure location, and their physical location is verified by satellite geolocation techniques. In this figure, network node 2100 is in a known secure location, and its location is verified by satellite geolocation techniques.

The network nodes are assigned a high level of trust (denoted by the letter "H") if they are not located in a known secure location, but their physical location is verified by satellite geolocation techniques. Network nodes 2200 and 2300 are in an unsecure location, but their physical locations are verified by satellite geolocation techniques. Also, the network nodes are assigned a medium level of trust (denoted by the letter "M") if they are not in a known secure location, but their physical location is estimated by network ping ranging measurements. Network node 2400 is in an unsecure location, but its physical location is estimated by network ping ranging measurements. In addition, the network nodes are assigned a low level of trust (denoted by the letter "L") if they are not located in a secure known location and cannot have their physical location verified by satellite geolocation techniques or estimated by network ping ranging measurements. In this figure, network nodes 2500 and 2600 are located in an unsecure location and cannot have their physical locations verified by satellite geolocation techniques or estimated by network ping ranging measurements.

In FIG. 2, a satellite 2700, which is acting as a transmission source, is shown to be transmitting spot beams 2800 and 2900 to the Earth. The spot beams 2800 and 2900 contain at least one authentication signal. The authentication signal(s) is used to verify the physical locations of any network nodes that lie within the spot beams 2800 and 2900. The discussion in the Spot Beam Based Authentication section of the present disclosure describes in detail how the authentication signal(s) are used to verify the physical locations. In this figure, network node 2100 is shown to lie in spot beam 2800, and network nodes 2200 and 2300 are shown to lie within spot beam 2900. Network node 2100 is assigned a very high level of trust because it is located in a known secure location, such as a military base, and its physical location is verified by satellite geolocation techniques employing satellite 2700.

The network nodes 2200 and 2300 are assigned a high level of trust because their physical locations are verified by satellite geolocation techniques, and they are not located in a known secure location.

In this figure, network node 2400 has its physical location estimated by network ping ranging measurements. In order to obtain the network ping ranging measurements, in one or more embodiments, network node 2100 and/or network node 2300, which both have their physical locations verified by satellite geolocation techniques as shown in the figure, send an inquiry message to network node 2400. Once network node 2400 receives the inquiry message, network node 2400 sends a response message back to network node 2100 and/or network node 2300. The amount of time lapsed from network node 2100 and/or 2300 sending the inquiry message to receiving the response message is used to generate network ranging ping measurements. The network ranging ping measurements are used to generate an estimate of the physical location of network node 2400. Since network node 2400 has its physical location estimated by network ping ranging measurements and it is not located in known secure location, it is assigned a medium level of trust. Network node 2500 is assigned a low level of trust because it is not located in a known secure location, and it does not have its physical location verified by satellite geolocation techniques or estimated by network ping ranging measurements.

FIG. 3 is a schematic diagram illustrating the disclosed feature of encrypted tunneling, in accordance with at least one embodiment of the present disclosure. In this figure, a network 3000 containing a number of network nodes is shown. Network node A wants to transmit data to network node E via a path that has a very high degree of trust. In order to achieve this, routers, or associated hardware, determine a specific path to route the data through that maintains a very high degree of trust. In this case, network path A (very high level of trust)—B (very high level of trust)—C (high level of trust)—D (high level of trust)—E (very high level of trust) is identified as the most secure path between network node A and network node E. Since this particular path contains network nodes having a very high level of trust and network nodes having a high level of trust, and a path's degree of trust is defined as being the lowest level of trust of its network nodes, this particular path is assigned a high degree of trust.

Network node A, which has a very high level of trust, can transmit the data to network node B because network node B also has a very high level of trust. However, network node B cannot transmit the data to network node E through any network nodes because none of the network nodes that lie between network node B and network node E have a very high level of trust. In order for network node B to be able to transmit the data to network node E and maintain a very high degree of trust, network node B transmits the data via an encrypted tunnel 3100 that is formed between network node B and network node E. The resulting network path for the data to travel is A (very high level of trust)—B (very high level of trust)—encrypted tunnel—E (very high level of trust).

In order for the encrypted tunnel 3100 to be formed, network node B encrypts the data prior to transmission. In one or more embodiments, a processor associated with network node B performs the encryption. After network node B encrypts the data, network node B transmits the data to network node E through network nodes C and D, which both have a high level of trust. It should be noted that although FIG. 3 illustrates the encrypted tunnel 3100 as spanning directly from network node B to network node E, this is only a symbolic illustration of the encrypted tunnel and, in reality, the data is actually routed from network node B to network node E through network node C and network node D. In one or more embodiments, once network node E receives the encrypted data, a processor associated with network node E decrypts the encrypted data.

In other embodiments, if network node D, similar to network node E, had a very high level of trust, network node D could, optionally, decrypt the encrypted data once network node D received the encrypted data from network node C. Once network node D decrypts the encrypted data, network node D would then forward the decrypted data to network node E.

Figure 4:
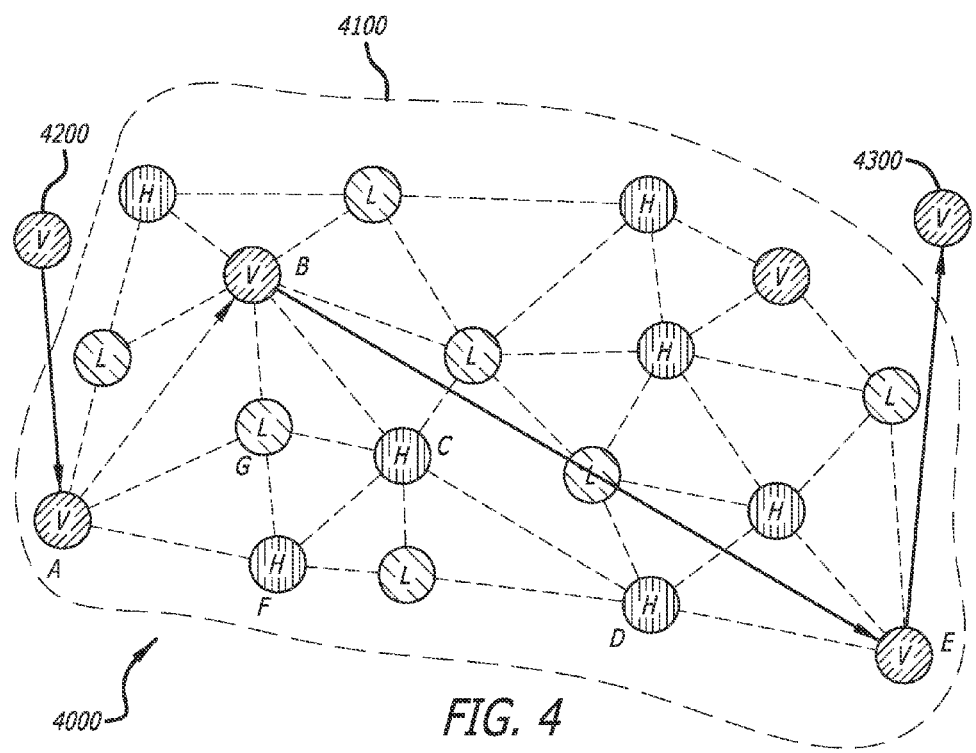
FIG. 4 is a schematic diagram depicting the disclosed feature of utilizing an autonomous system, in accordance with at least one embodiment of the present disclosure.

FIG. 4 is a schematic diagram 4000 depicting the disclosed feature of utilizing an autonomous system, in accordance with at least one embodiment of the present disclosure. In this figure, an autonomous system 4100 containing a network of nodes is shown. The disclosed system and method may employ at least one autonomous system to route data through. Various different types of autonomous systems may be employed. Examples of autonomous systems that may be utilized by the disclosed system include, but are not limited to, an AT&T network, a Sprint network, a Level 3 network, a Qwest network, a UUnit network, and a Global Crossing network.

Similar to a network path, an autonomous system is assigned a degree of trust. In one or more embodiments, the degree of trust of an autonomous system is equal to the lowest level of trust of its network nodes. Since the autonomous system 4100 contains network nodes with a very high level of trust, network nodes with a high level of trust, and network nodes with a low level of trust, for these embodiments, the autonomous system 4100 has a low level of trust.

However, in other embodiments, the degree of trust of an autonomous system is equal to the degree of trust of a path that traverses through the autonomous system. In this figure, a path is shown to start from network node A, which has a very high level of trust, and route to network node B, which also has a very high level of trust. An encrypted tunnel is formed from network node B to network node E, which also has a very high level of trust. Since this particular path in the autonomous system 4100 only travels through network nodes having a very high level of trust, this path has a very high degree of trust. As such, for these embodiments, the autonomous system 4100 has a very high degree of trust.

In this figure, network node 4200 wants to send data to network node 4300 over a path with a very high degree of trust. Since, as mentioned above, the data can be routed through the autonomous system 4100 on a path with a very high degree of trust, network node 4200 transmits the data to network node 4300 through the autonomous system 4100.

Figure 5:
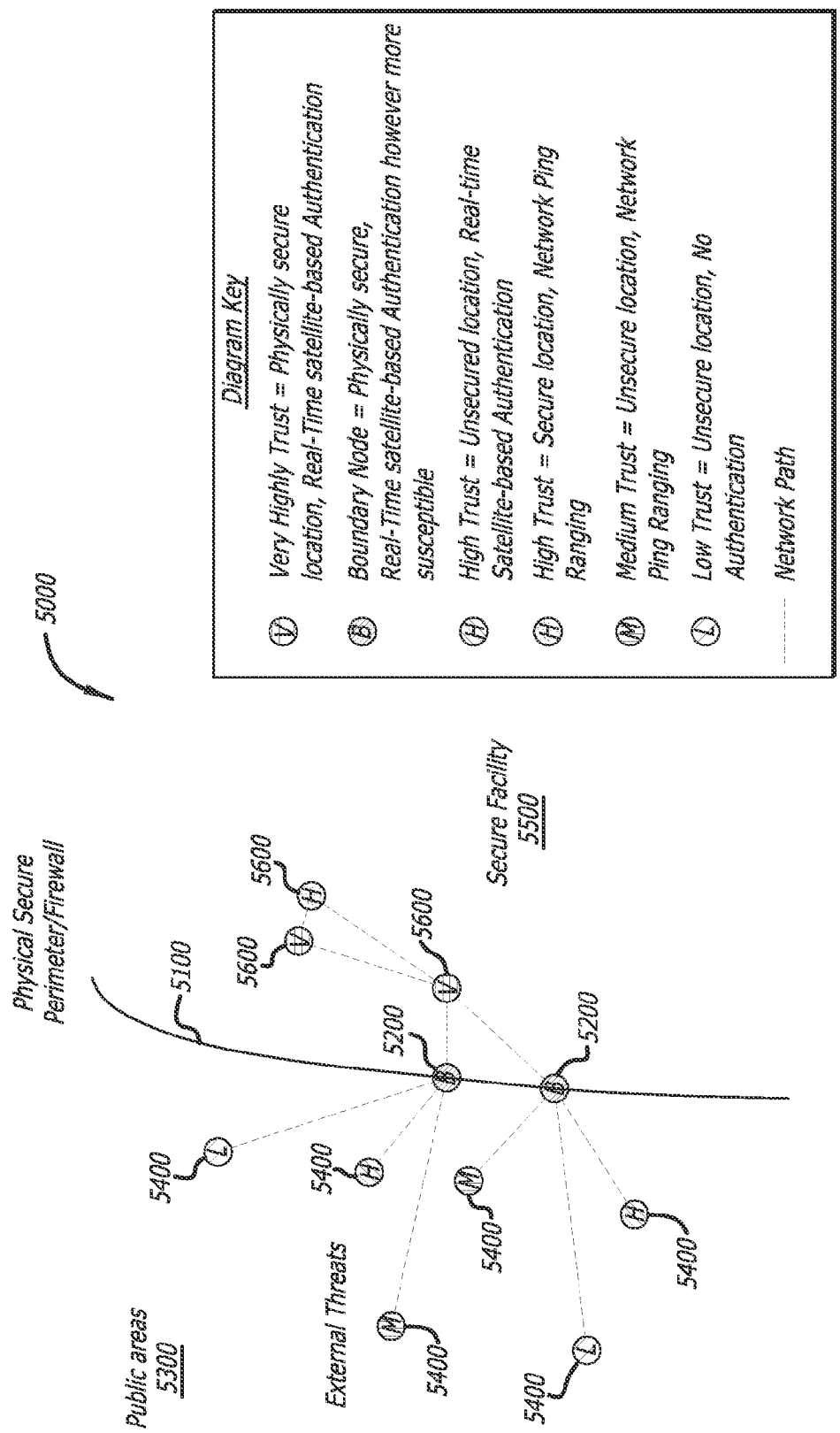
FIG. 5 is a schematic diagram illustrating the disclosed feature of boundary firewall nodes, in accordance with at least one embodiment of the present disclosure.

FIG. 5 is a schematic diagram 5000 illustrating the disclosed feature of boundary firewall nodes, in accordance with at least one embodiment of the present disclosure. In this figure, a perimeter 5100 is shown to be lined with two boundary firewall nodes 5200. The boundary firewall nodes (or routers) 5200 are used as gatekeepers to data attempting to pass through the perimeter 5100 to the network of nodes 5600 in the secure facility 5500. Each boundary firewall node 5200 determines whether data, that is attempting to pass through the perimeter 5100 or boundary firewall node 5200, has previously traveled through a path with a high enough degree of trust. If the data has previously traveled through a path with a high enough degree of trust, the boundary firewall node 5200 will allow the data to pass through the boundary firewall node 5200. Each boundary firewall node 5200 has a set threshold degree of trust requirement, and it will require data to have previously traveled through a path having at least that threshold degree of trust in order for the boundary firewall node 5200 to allow the data to pass through it. In this figure, the boundary firewall nodes 5200 will only allow data that has previously traveled through a path with a very high degree of trust or a high degree of trust to pass from the public area 5300 of network nodes 5400 through the perimeter 5100 into the secure facility 5500 of network nodes 5600.

Geothentication Based on Network Ranging

The system and method for geothentication based on network ranging relates to authenticating the physical location of a network node (i.e. a target node) by using ranging measurements taken from at least one node with a known physical location. The physical location of at least one node is obtained via satellite geolocation techniques. Various types of satellite geolocation techniques may be employed by the disclosed system. The description of FIGS. 11 through 14 in the present disclosure discusses one exemplary satellite geolocation technique (i.e. spot beam based authentication) that may be utilized by the disclosed system.

Current access control approaches to combat the increasing number of cyber attacks are principally based on either static passwords or authentication based on password and badge credentials. As attacks are often conducted by impersonating the end user, there has been a tendency for organizations to focus on user authentication methods to curtail network vulnerabilities. These approaches continue to be vulnerable to sophisticated attacks and, thus, a need has developed for a new paradigm of access control leveraging additional information, such as the users' physical location. This information provides an additional and orthogonal layer of protection, which results in an enhanced correlation between location and contextual awareness from an integrated physical geolocation to a logical network and information management views. This means that incoming data for a particular network node may be vetted based on its physical location, and various access rights granted to it based on such information.

The physical location of a network node is currently difficult to ascertain using existing tools. Its location may be inferred by examining internet protocol (IP) addresses and host names, but these identifiers may be spoofed or obfuscated. Alternatively, and more securely, the physical location of a network node may be attained by estimation using network ping ranging measurements.

In the present disclosure, a ping is a computer network administration utility used to test the reachability of a node on an Internet Protocol (IP) network, and to measure the round-trip time for messages sent from an originating node (i.e. the node that sends the inquiry ping message) to a destination node (i.e. the node that receives the inquiry ping message and sends the response ping message). A ping operates by an originating node sending Internet Control Message Protocol (ICMP) echo request data packets to the destination node, and waiting for a response. In this process, a processor is used to measure the round-trip time from transmission of the inquiry ping message, and to record any data packet loss.

The system and method for geothentication based on network ranging have four primary features. The first primary feature is the use of network ping ranging measurements to estimate a physical location of a network node. Such a determination may increase the level of trust in a network, and is achieved by sending pings from a secure, trusted network node(s) with a known location to the target network node in question. In one or more embodiments, the originating node (i.e. the node that sends the inquiry ping message) will then examine the differentials between the time sent and the time received, and derive a physical range estimation. More than one originating node performing ping ranging can follow this process in order to improve the accuracy and the reliability of the end result.

The second primary feature is the use of ping pre-coordination and/or prioritization. This feature is based on the need for the immediate return of the ping (i.e. the immediate sending of a ping response message) from a destination node, which is crucial for the accuracy of the method of the first primary feature. Any associated delay introduced by the delay in the response will increase the measured network range and, thus, increase the maximum physical range measured. This increases the uncertainty of the actual physical location of the network node. As such, this feature proposes the use of various "Fast Track" methods in which results may be improved upon by using pre-coordination and/or prioritization of inquiry pings and/or response pings, which may allow for the destination node to respond to ping requests as quickly as possible, thereby reducing range error and improving the accuracy of the end result.

The third primary feature is the utilization of dedicated ping response "Fast Track" hardware. The use of dedicated ping response "Fast Track" hardware better enables the "Fast Track" methods of the second primary feature. Such hardware is attached to and/or connected to devices involved in the network ranging, and may also be used to improve the accuracy of the end result by pre-coordinating and/or prioritizing the responses to the ping inquiries.

The fourth primary feature is the use of unique identifiers (e.g., a pseudo random code (PRC) made up of some number of random bits) within inquiry ping messages such that cannot be predicted and that may be copied into the response ping messages by the destination node(s). These unique identifiers work to ensure that the response ping message(s) received by the originating node was, in fact, a response to the inquiry ping message that was sent by the originating node.

It should be noted that throughout the description of the figures a certain naming convention for the network nodes has been followed. The naming convention is as follows. A target node is a network node in question that the disclosed system and method will attempt to authenticate by verifying its physical location. A trusted node(s) is a network node(s) that has a known physical location. In one or more embodiments, the physical location of the trusted node(s) is obtained from satellite geolocation techniques. However, in some embodiments, the physical location of at least one trusted node is obtained through other means including, but not limited to, terrestrial mapping data. Also, an originating node is a network node that sends a inquiry ping message, and a destination node is a network node that receives the inquiry ping message and sends a response ping message back to the originating node.

Figure 6:
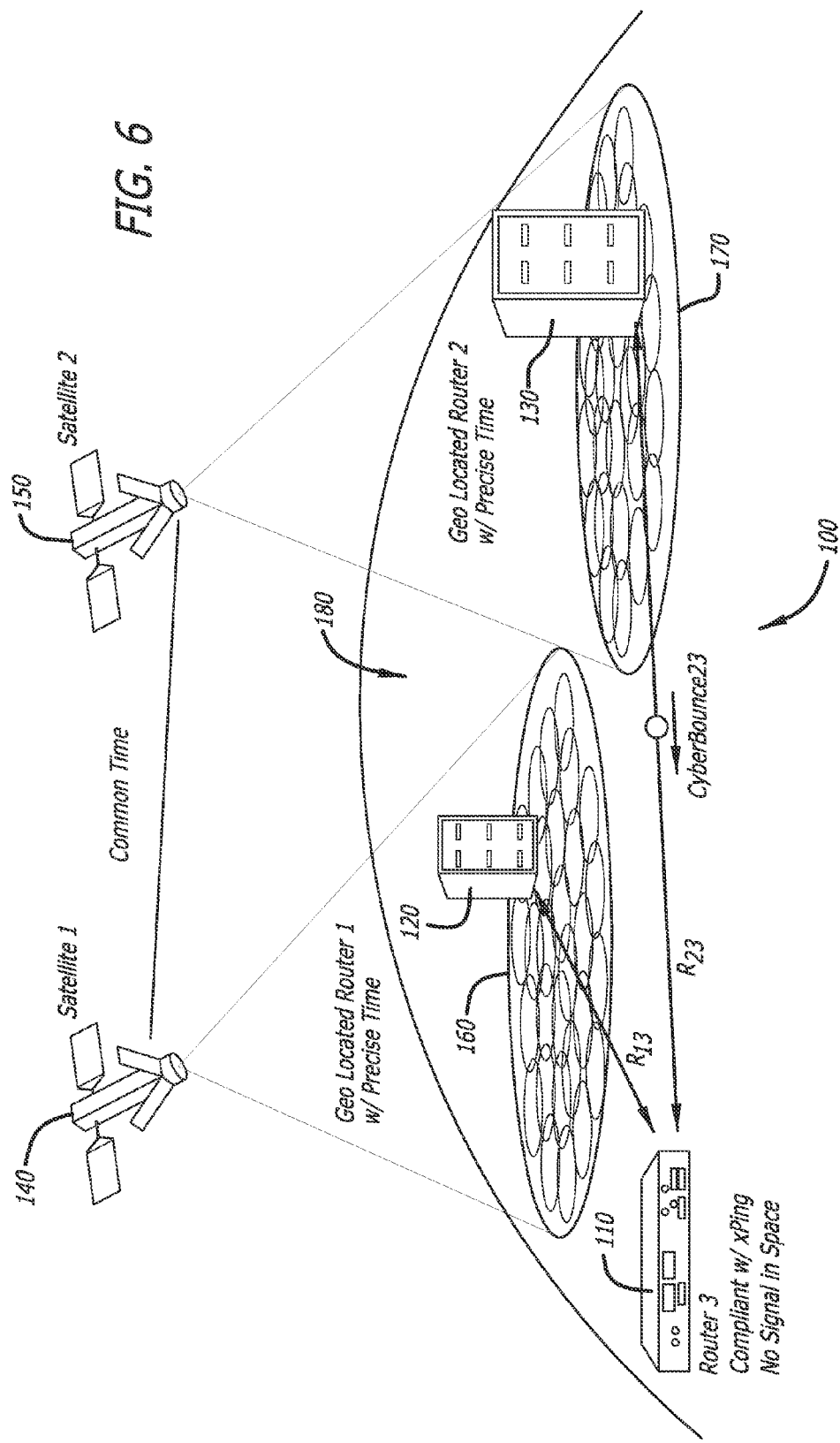

FIG. 6 is a schematic diagram of the disclosed system 100 for authenticating the physical location of a target node (Router 3) 110, in accordance with at least one embodiment of the present disclosure. In this figure, a network of network nodes 110, 120, 130 (which are implemented by routers) is shown in which authentication of the physical location for Router 3 110 is desired. Router 1 120 and Router 2 130 are at verified physical locations (as such they are referred to as trusted nodes), but the physical location of Router 3 110 is unknown or unverified.

The physical locations of Router 1 120 and Router 2 130 (i.e. trusted nodes) are obtained through satellite geolocation techniques. As is shown in this figure, Satellite 1 140 and Satellite 2 150 are both transmitting a plurality of spot beams 160, 170 on Earth 180. Router 1 120 and Router 2 130 are being illuminated by at least one of the plurality of spot beams 160, 170 being transmitted from Satellite 1 140 and Satellite 2 150, respectively. The physical locations of Router 1 120 and Router 2 130 are obtained from various different types of geolocation authentication systems and methods.

In one or more embodiments, a spot beam based authentication system and method is used by the system 100 to authenticate the physical locations of Router 1 120 and Router 2 130. For these embodiments, LEO Iridium satellites are employed for the satellites 140, 150 to each transmit at least one authentication signal that is used to authenticate the physical locations of Router 1 120 and Router 2 130. A receiving source (not shown) associated with Router 1 120 and a receiving source (not shown) associated with Router 2 130 are used to receive the authentication signals transmitted from Satellite 1 140 and Satellite 2 150 (i.e. transmission sources), respectively. A detailed discussion regarding the spot beam based authentication system and method is presented below in the Spot Beam Based Authentication Section of the present disclosure. In addition, it should be noted that an authenticator device (not shown) may be employed by the disclosed system 100 for authenticating the physical locations of Router 1 120 and Router 2 130 by evaluating at least one authentication signal transmitted from each of the satellites 140, 150. Additionally, it should be noted that in various embodiments, the authentication signals may be transmitted from the same transmission source, from different transmission sources, on the same frequency, and/or on different frequencies.

The spot beams of the plurality of spot beams 160, 170 may have a circular footprint as is shown in this figure, or in other embodiments may be a shaped spot beam that has a footprint of an irregular shape. Various types of satellites and/or pseudo-satellites may be employed for Satellite 1 140 and/or Satellite 2 150 of the disclosed system 100. Types of satellites that may be employed for the satellites 140, 150 include, but are not limited to, lower Earth orbiting (LEO) satellites, medium Earth orbiting (MEO), and geosynchronous Earth orbiting (GEO) satellites. In one or more embodiments, a LEO Iridium satellite is employed by the system 100 for the satellite 140, 150. Employing this type of satellite is advantageous because its transmission signal is strong enough to propagate through attenuated environments, including being propagated indoors.

It should be noted that in some embodiments, various other types of devices other than routers may be implemented for the network nodes 110, 120, 130 of the disclosed system 100. Types of devices that may be employed for the network nodes 110, 120, 130 include, but are not limited to, a server, a personal computing device, a personal digital assistant, a cellular phone, a computer node, an internet protocol (IP) node, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and a fourth generation (4G) wireless node.

During operation of the disclosed system 100, Router 1 120 (i.e. the originating node) sends an inquiry ping message to Router 3 110 (i.e. the destination node) (see route $R_{13}$). In response to receiving the inquiry ping message, Router 3 110 sends a response ping message to Router 1 120 (see route $R_{13}$). A processor (not shown) associated with Router 1 120 calculates a ranging measurement from Router 1 120 to Router 3 110 by using an amount of time lapsed from Router 1 120 sending the inquiry ping message to Router 1 120 receiving the response ping message. This ranging measurement, which is referred to as network ping ranging, produces an approximation and a maximum bound of the physical range between the two network nodes (e.g., Router 1 120 and Router 3 110), and can be computed using the following equation:

$$R_{OD} = c[(t_{Da} - t_{Oa}) + (t_{Ob} - t_{Db}) + d]/2, \quad \text{where} \quad t = \text{time and } c = \text{speed of signal} \quad \text{(EQN 1)}$$

Where "O" refers to the originating node (i.e. Router 1 120) that initiates the method by sending an inquiry ping message to "D" which refers to the destination node (i.e. Router 3 110), which in turn sends a response ping message to the originating node; and where "d" refers to time delays not related to signal travel time, such as the time required for the destination node to generate the response ping message after receiving the inquiry ping message. In some embodiments, more than one network node performing network ranging can follow this process to improve the accuracy and the reliability of the result. This may relate to individual nodes (i.e. routers, servers, personal computing devices such as laptops, desktops, PDAs, cell phones, etc.) or more collectively as a system of said network nodes.

Further, if the speed of signal (c) can be guaranteed to be below a maximum speed ($c_{MAX}$), then the measurement can establish not only a range estimate, but also a maximum range by the following equation:

$$R_{OD\_MAX} = c_{MAX}[(t_{Da} - t_{Oa}) + (t_{Ob} - t_{Db}) + d_{MIN}]/2,$$
where $t$=time and $c_{MAX}$=maximum speed of signal (EQN 2)

Where "$d_{MIN}$" refers to the minimum possible delay time for the system (the most conservative assumption being to assume $d_{MIN}$=0.) For a particular pair of network nodes, multiple measurements can be taken, but rather than being averaged, the measurement that reports the smallest $R_{MAX}$ can be relied upon as the maximum range between the two network nodes.

It should be noted that in other embodiments, a processor that is not associated with Router 1 120 may perform the ranging measurement calculation. For these embodiments, Router 1 120 must transmit to the processor the amount of time lapsed from Router 1 120 sending the inquiry ping message to Router 1 120 receiving the response ping message. Once the processor receives the amount of time, the processor will be able to perform the ranging measurement calculation.

Then, a processor (e.g., the processor associated with Router 1 120, the processor associated with Router 2 130, or some other processor) uses the ranging measurement calculated from route $R_{13}$ to obtain and/or authenticate the physical location of Router 3 110.

As shown in this figure, Router 2 130 also sends an inquiry ping message to Router 3 110 (see route $R_{23}$). Router 3 110, in response to receiving the inquiry ping message, sends a response ping message to Router 2 130 (see route $R_{23}$, also referred to as CyberBounce23). A processor (not shown) associated with Router 2 130 calculates a ranging measurement from Router 2 130 to Router 3 110 by using an amount of time lapsed from Router 2 130 sending the inquiry ping message to Router 2 130 receiving the response ping message.

In alternative embodiments, a processor that is not associated with Router 2 130 may perform the ranging measurement calculation. For these embodiments, Router 2 130 must transmit to the processor the amount of time lapsed from Router 2 130 sending the inquiry ping message to Router 2 130 receiving the response ping message. Once the processor receives this amount of time, the processor can perform the ranging measurement calculation.

Then, a processor (e.g., the processor associated with Router 1 120, the processor associated with Router 2 130, or some other processor) uses the ranging measurement calculated from route $R_{23}$ in conjunction with the ranging measurement calculated from route $R_{13}$ in order to obtain and/or authenticate the physical location of Router 3 110. In other embodiments, the processor uses the ranging measurement calculated from route $R_{23}$ in order to improve the accuracy of the physical location for Router 3 110 that is obtained by using only the ranging measurement calculated from route $R_{13}$.

In one or more embodiments, a processor (e.g., the processor associated with Router 1 120, the processor associated with Router 2 130, or some other processor) uses the obtained physical location for Router 3 110 and the known physical locations for Router 1 120 and Router 2 130 to generate a physical map of the locations of these network nodes 110, 120, 130. The physical map may additionally contain various types of terrain data including, but not limited to, topological data, street names data, and landmark data. Furthermore, a mapping overlay of Internet Protocol (IP) information on the physical map may also be implemented.

It should be noted that the immediate return of the ping response message from the destination node is crucial for the accuracy of this method. Any delay introduced by the destination node will increase the measured network range between the network nodes and, therefore, increase the maximum physical range estimation between them. This increases the uncertainty of the actual physical location of the target node (i.e. Router 3 110), as there is a greater physical area in which it may lie.

In some embodiments of the present disclosure, the estimation of the physical location of a target node is improved upon by using pre-coordination and/or prioritization of ping messages, and may include the use of dedicated ping response message hardware. For example, a method for hastening the response to a ping inquiry message sent from an originating node may be utilized by the disclosed system 100 that informs the destination node, prior to the sending of the ping inquiry message, that a ping inquiry message is coming at a specified time. The destination node may then prepare immediately before the specified time to give the incoming inquiry ping packet message its top priority, and to immediately reply when the inquiry ping message arrives. In some embodiments, the destination node is programmed to send the response ping message after a specific amount of time has passed after the destination node has received the inquiry ping message. In at least one embodiment, the destination node is programmed to send the response ping message at a specific time or at specific times with a designated time interval, which is either defined or random.

In at least one embodiment, the inquiry ping message sent from an originating node to a destination node will contain a unique identifier that cannot be predicted (e.g. a number of random bits) that at least a portion of is copied into the response ping message that is sent from the destination node to the originating node. This ensures that the response ping message received by the originating node was, in fact, a response to the inquiry ping message it originally sent and not a response from a spoofer. In at least one embodiment, a random seed may be used to initiate a random number generator (e.g., pseudo random number generator) to provide the unique identifier.

In some embodiments, the prioritization of ping messages may be devised without using pre-coordination methods. For example, a level of priority could be assigned to data packets of varying priority and/or other queuing logic used to process packets as such. While data packets associated with the authentication of the physical location of a target node (i.e. ping message data packets) may be a high priority (or even at the highest priority above performing other actions), the system may additionally be utilized for sending other critical information that may be of greater overall importance, and thus a set of priority levels and/or queuing logic may be used to minimize the delay in the sending of the response ping message but while not impacting the quality of service for higher importance data routing.

Figure 7A:
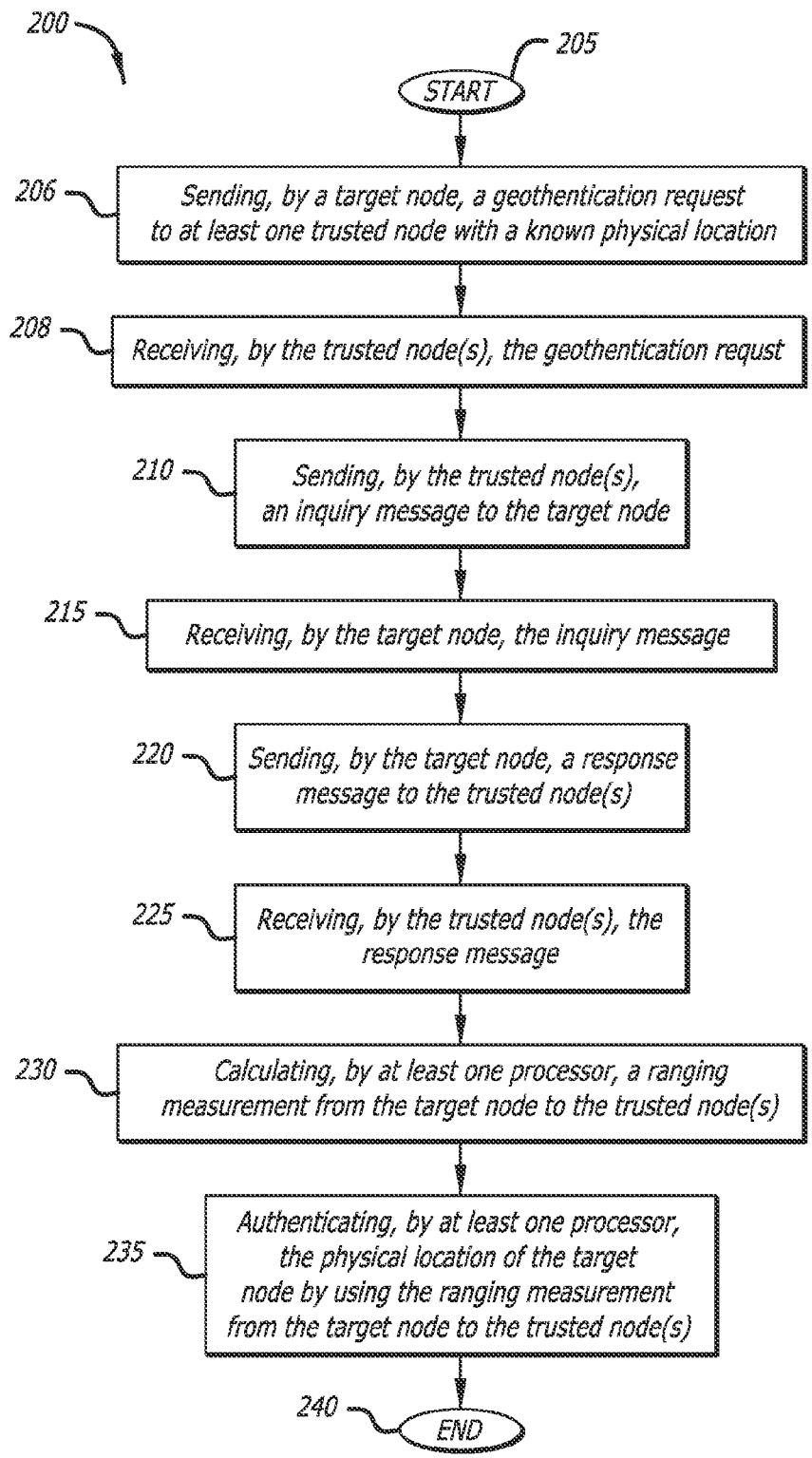
FIG. 7A is a flow diagram of the disclosed method for authenticating the physical location of a target node where the target node sends a geothentication request, in accordance with at least one embodiment of the present disclosure.

FIG. 7A is a flow diagram 200 of the disclosed method for authenticating the physical location of a target node where the target node sends a geothentication request, in accordance with at least one embodiment of the present disclosure. At the start 205 of the method, the target node sends a geothentication request to at least one trusted node with a known physical location 206. The physical location of the trusted node(s) is obtained via satellite geolocation techniques. Then, the trusted node(s) receives the geothentication request 208.

The trusted node(s) (i.e. the originating node(s)) then sends an inquiry ping message to the target node (i.e. the destination node) 210. Then, the target node receives the inquiry ping message 215. Soon after the target node receives the inquiry ping message, the target node sends a response ping message to the trusted node(s) 220. The trusted node(s) then receives the response ping message 225. After the trusted node(s) receives the response ping message, at least one processor calculates a ranging measurement from the target node to the trusted node(s) by using the amount of time elapsed from the sending of the inquiry ping message to the receiving of the response ping message 230. Once the processor(s) has calculated the ranging measurement, at least one processor (which may be the same or a different processor(s) than the processor(s) that calculated the ranging measurement) authenticates the physical location of the target node by using the ranging measurement from the target node to the trusted node(s) 235. After the processor(s) authenticates the physical location of the target node, the method ends 240.

Figure 7B:
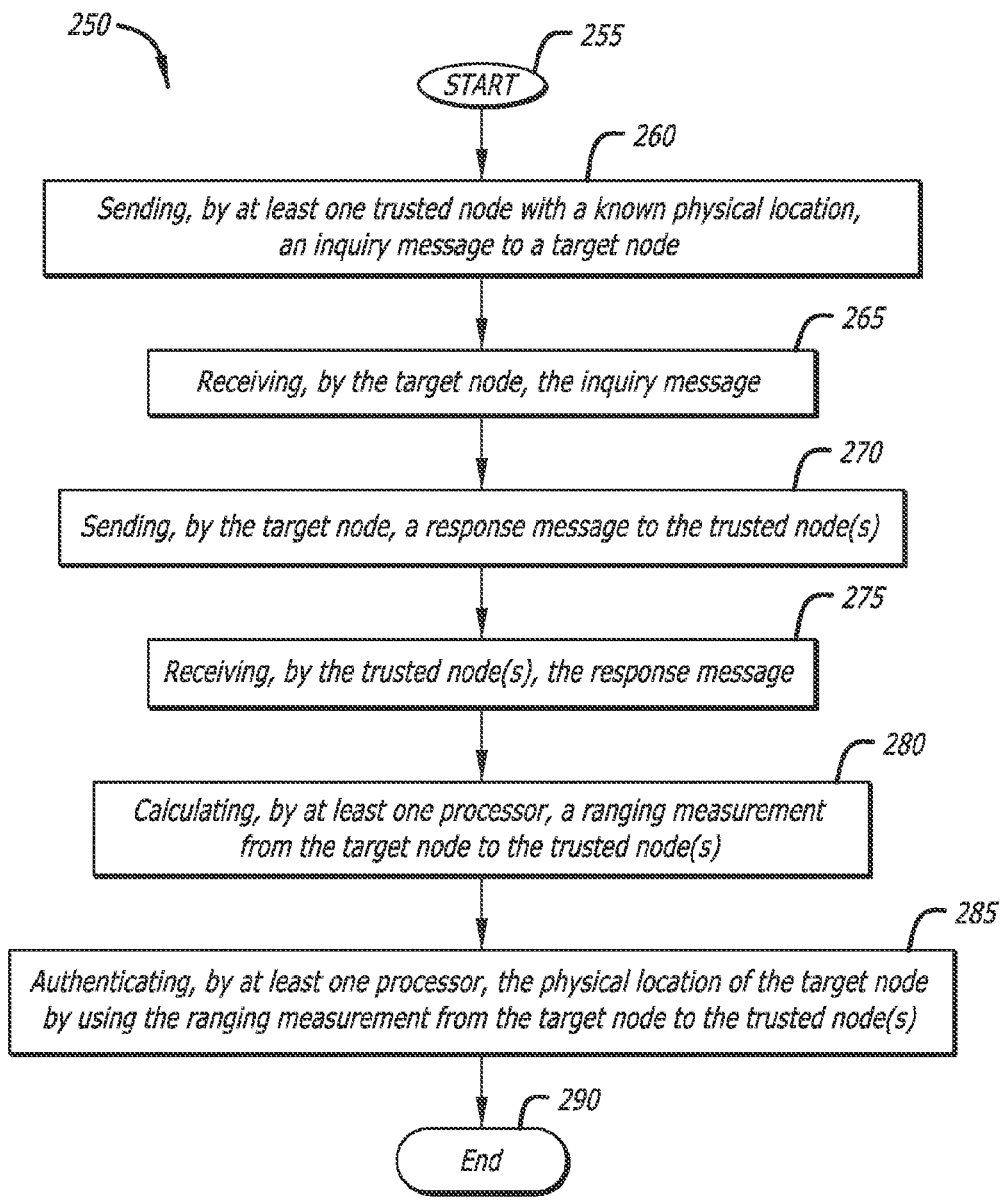
FIG. 7B is a flow diagram of the disclosed method for authenticating the physical location of a target node where at least one trusted node with a known location sends the inquiry message, in accordance with at least one embodiment of the present disclosure.

FIG. 7B is a flow diagram 250 of the disclosed method for authenticating the physical location of a target node where at least one trusted node with a known location sends the inquiry ping message, in accordance with at least one embodiment of the present disclosure. At the start 255 of the method, at least one trusted node with a known physical location (i.e. the originating node(s)) sends an inquiry ping message to the target node (i.e. the destination node) 260. The physical location of the trusted node(s) is obtained via satellite geolocation techniques.

Then, the target node receives the inquiry ping message 265. Soon after the target node receives the inquiry ping message, the target node sends a response ping message to the trusted node(s) 270. Then, the trusted node(s) receives the response ping message 275. After the trusted node(s) receives the response ping message, at least one processor calculates a ranging measurement from the network node to the trusted node(s) by using the amount of time elapsed from the sending of the inquiry ping message to the receiving of the response ping message 280. Once the processor(s) has calculated the ranging measurement, at least one processor (which may be the same or a different processor(s) than the processor(s) that calculated the ranging measurement) authenticates the physical location of the target node by using the ranging measurement from the target node to the trusted node(s) 285. After the processor(s) authenticates the physical location of the target node, the method ends 290.

Figure 8:
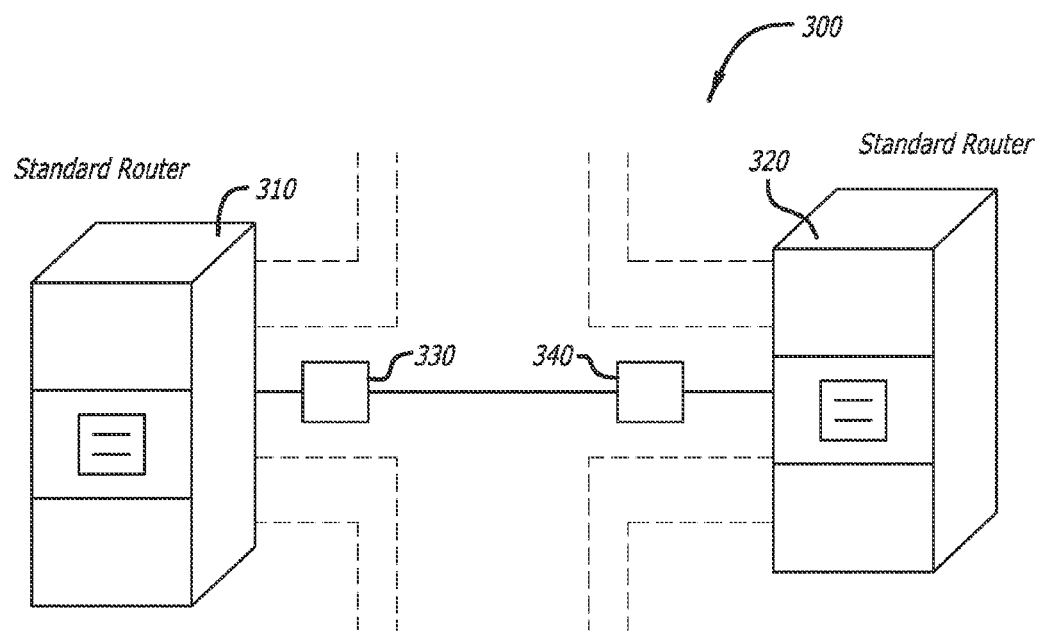

FIG. 8 is a schematic diagram 300 of two network routers 310, 320 each employing a response message hardware device 330, 340 for sending messages, in accordance with at least one embodiment of the present disclosure. In this figure, two network routers 310, 320 are shown to each be connected (i.e. by wire or wirelessly) to dedicated response message hardware (i.e. "Fast Track" device) 330, 340. In some embodiments, the dedicated response hardware 330, 340 is physically attached to or housed within the network routers 310, 320.

The response message hardware 330, 340 is able to send a response ping message after receiving an inquiry ping message with little to no delay. Since the response message hardware 330, 340 is able to send a response ping message with little to no delay, the response message hardware 330, 340 allows for a more accurate determination of the physical location of the target node by using network ping ranging measurements. The response message hardware devices 330, 340 reside in the path between the routers 310, 320, and they function to send and receive the ping inquiry messages and the ping response messages. For these embodiments, the response message hardware devices 330, 340 give the ping messages their highest priority.

The response message hardware devices 330, 340 may have the sole purpose of sending and receiving the specially-designated ping messages. The devices 330, 340 are designed to reside in the data path between nodes (e.g., routers 310, 320), and may serve as a pass-through for all data except the specially-designated ping messages, which the devices 330, 340 immediately return. In some embodiments, the devices 330, 340 may also inject signals into the data path between the nodes 310, 320 without interfering with the standard traffic. Pre-coordination of the sending of the ping messages may also be performed by the devices 330, 340.

In at least one embodiment, trust of a network node can be transferred from a node with a verified physical location (i.e. a trusted node) to a node without a verified physical location (i.e. a non-verified node or target node). This can occur, for example, when one dedicated response message hardware device 330 (adjacent to a node 310 with verified physical location, such as if a dedicated response message hardware device is attached to a computing device, for instance, through a universal serial bus (USB) connection) is commanded to send an inquiry ping message through the line. The corresponding response message hardware device 340 on the other end of the line (adjacent to a node 320 that does not have its physical location verified) quickly replies to the inquiry ping message by sending a response ping message. The first device 330 receives the returned response ping message, performs the ranging measurement calculation, and reports the network range to the non-verified node 320. A trusted, physically-verified node 310 can "transfer" trust if a dedicated response message hardware device 330, 340 is on both ends. Trust is inherited if the calculated range is consistent with measured and verified physical locations.

Figure 9:
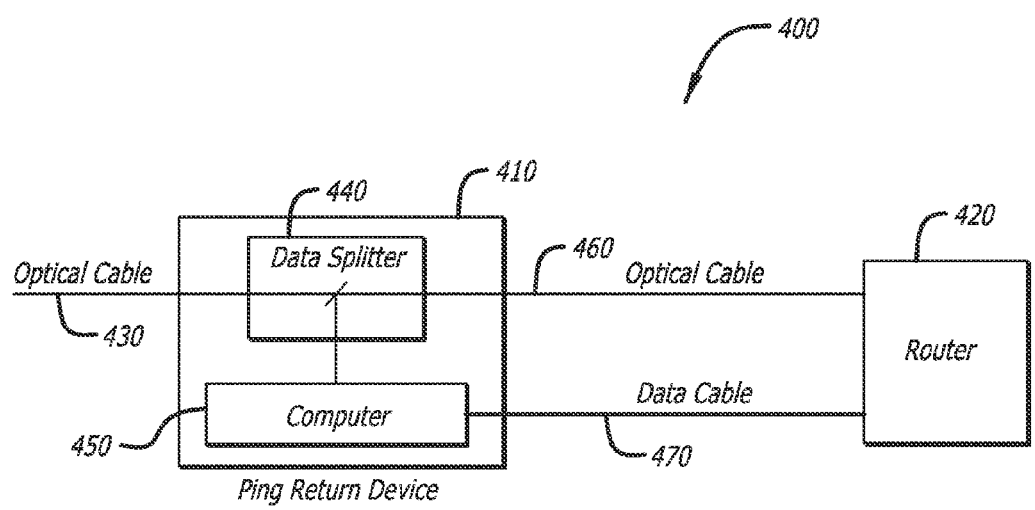

FIG. 9 is a schematic diagram 400 of a response message hardware device 410 attached to a router 420 showing the device 410 being placed in-line with the incoming data line (e.g., an optical fiber cable) 430, in accordance with at least one embodiment of the present disclosure. The response message hardware device 410 utilizes a data splitter 440 (e.g., a biconic coupler) to split the incoming data. The data splitter 440 passes the incoming data via an optical cable 460 (or via some other means) to the router 420, and also passes the incoming data to computer circuitry 450. The computer circuitry 450 passes the data via a data cable 470 to the router 420. By controlling the data flow of the attached router 420, the computing circuitry 450 may, thus, prioritize and/or pre-coordinate the ping messages between it 410 and other dedicated response message hardware devices, and may do so in a way to limit impact to the throughput data. For example, two routers each having a dedicated response message hardware device may both adhere to a schedule of times when they are to halt standard data transmission and perform the sending and receiving of the ping messages (e.g., perform the sending and receiving of ping messages during one millisecond of time after every ten (10) seconds of data transmission has passed).

In at least one embodiment, the dedicated response message hardware device 410 may also contain satellite tracking hardware and firmware to perform verification of the physical location of itself 410 and/or the router 420 using satellite ranging techniques. In one or more embodiments, the dedicated response message hardware device 410 could effectively be built into the network router 420 itself, therefore not requiring the use of a data splitter 440.

FIGS. 10A, 10B, and 10C are schematic diagrams 500, 505, 510, when viewed together, depicting a new node 520 (i.e. a target node) entering the network and having its physical location authenticated by the disclosed system, in accordance with at least one embodiment of the present disclosure. In at least one embodiment, a new node 520 may come "online" and send an inquiry ping message to aid in confirming it as a "trusted" node. This may be a case where the new node 520 contains trusted hardware and is located in a trusted location (e.g., the new node 520 is a new router that is installed on a military base). However, in at least one embodiment, the new node may be an uncontrolled device. In these embodiments, the new node may be converted to a "trusted" node when its physical location becomes verified through the use of ping ranging measurements.

In FIG. 10A, a new unauthenticated node 520 (i.e. a target node) that desires to be converted to a "trusted" node sends a geothentication ping request to Router 1 530, Router 2 540, and Router 3 550. The physical locations of the three routers 530, 540, 550 are verified by using satellite geolocation techniques that utilize signals transmitted from satellites 560, 570, 580. In response, in FIG. 10B, the routers 530, 540, 550 send inquiry ping messages to the new node 520. Once the new node 520 receives the ping inquiry messages, in FIG. 10C, the new node 520 sends response ping messages to the routers 530, 540, 550. Processors (not shown) associated with each of the routers 530, 540, 550 calculate a ranging measurement from the new node 520 to its associated router 530, 540, 550 by using the amount of time lapsed from the sending of the ping inquiry message to the receiving of the response ping message. At least one processor uses these calculated ranging measurements to authenticate the physical location of the new node 520. After the physical location of the new node is authenticated, the new node 520 is then considered to be a "trusted" node.

The disclosed methods allow network nodes to vet incoming data from a given node based on the node's physical location. In at least one embodiment, this may be used to improve the assigned trustworthiness of a network node. In some embodiments, access privileges may be granted based on the authentication of the node. In at least one embodiment, the access privileges granted may be based on the type of authentication method used for verifying the node's physical location, such that the method used with the highest accuracy/reliability may be assigned the highest level of access privileges, and alternatively the method with the lowest accuracy/reliability, relating to the node being the least trustworthy is assigned the lowest degree of access privileges.

Spot Beam Based Authentication

Entity or user authentication techniques enable a third party verifier to validate the identity and/or physical location of a user, asset, or a device (e.g., a claimant or network node) for a remote resource through a one-way authentication method. However, it should be noted that this one-way method may also be used directly by a host system to validate a claimant. An entity may be a device (e.g., a network node, a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However, this method can also be applied in a multi-way authentication technique to allow at least two peer devices to authenticate each other. In this one-way or multi-way device-to-device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This hinders a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$P\_SHA\text{-}1(\text{initial-security key,liveness}) = SHA\text{-}1(\text{initial-security key},A(1)+\text{liveness})+SHA\text{-}1(\text{initial-security key},A(2)+\text{liveness})+SHA\text{-}1(\text{initial-security key},A(3)+\text{liveness})+$  EQ 1:

where A(0)=liveness;
A(i)=SHA-1(initial-security key, A(i−1));
and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$PRF(\text{expanded initial-security key,label,liveness}) = P\_MD5(S1,\text{label+liveness}) \text{ XOR } P\_SHA\text{-}1(S2,\text{label+liveness})$  EQ: 2 where S1 is the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective ((g^(secret integer)) mod p). This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is appropriate that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

FIG. 11 is a schematic illustration of a satellite-based communication system 600, according to embodiments. In practice, a satellite based communication system 600 may comprise of at least one satellite 610 in orbit. In the interest of brevity, a single satellite is illustrated in FIG. 11. Referring to FIG. 11, in some embodiments a system 600 comprises one or more satellites 610 in communication with one or more receiving devices 620. In some embodiments the satellites 610 may be embodied as LEO satellites such as those within the Iridium satellite constellation. Satellite(s) 610 orbit the earth in a known orbit and may transmit one or more spot beams 630 onto the surface of the earth in a known pattern. Each spot beam 630 may include information such as pseudorandom (PRN) data and one or more distinctive beam parameters (e.g., time, satellite ID, time bias, satellite orbit data, etc.).

Receiving device(s) 620 may be implemented as communication devices such as satellite or cellular phones or as components of a communication or computing device, e.g., a personal computer, laptop computer, personal digital assistant or the like. In some embodiments, a receiving device (620) may comprise one or more locating or navigation devices or modules analogous to devices used in connection with the global positioning system (GPS).

FIGS. 12A, 12B, and 12C are schematic illustrations of satellite-based authentication systems 700, according to embodiments. Referring first to FIG. 12A, in some embodiments a satellite 610 in orbit transmits one or more spot beams 630 onto the earth's surface. A receiving device 620 may be configured to receive a signal from the spot beam. In the embodiment depicted in FIG. 12A the receiving device is ground-based and may be operating in attenuated environment. By way of example, an object 710 such as a roof, building, or the like may obstruct a portion of the communication path between satellite 610 and the receiving device.

A transmitter 720 transmits data received by the receiving device 620 and/or data generated by the receiving device 620 to a verifier 730. The transmitter 720 depicted in FIG. 12A is a wireless transmitter that relays the data from the receiving device to the verifier. However, one skilled in the art will recognize that data from receiving device 620 may be transmitted via a wired communication system, wireless communication system, or a combination of wired and wireless systems. The verifier 730 uses data captured via a spot beam by the receiving device 620 to prove to the verifier 730 that it is an authorized user via a one-way authentication approach which is also the case in FIG. 12B.

Furthermore, FIG. 12B depicts an arrangement in which the receiving device 620 may be airborne, e.g., in an aircraft 625. In the embodiment depicted in FIG. 12B the aircraft 625 may maintain an uplink with the satellite 610, e.g., an L-Band Uplink, and data captured by the receiving device 620 in the aircraft may be transmitted back to the satellite 610 via the uplink. The satellite 610 may transmit the data to a second cross-linked satellite 610, which in turn may transmit the data to a verifier 730.

The system depicted in FIG. 12C illustrates an embodiment in which two (or more) peer devices 620 may implement a two-way authentication technique to authentication each other. Referring briefly to FIG. 12C as described above a satellite 610 in orbit transmits one or more spot beams 630 onto the earth's surface. A first receiving device 620A may be configured to receive a signal from the spot beam. The first receiving device 620A may be configured to derive a security key, e.g., using a Diffie-Helman approach as described above, which incorporates PRN data from the spot beam.

The PRN data is also transmitted to a second device 620B. In some embodiments the second device 620B may be outside the spot beam 630, in which case the PRN data may be transmitted by a computing device 740 coupled to the second device 620B via a communication network. The computing device 740 may be communicatively coupled to the satellite 610. By way of example, and not limitation, the computing device 740 may be a server that is separately coupled to the satellite 610 via a communication link. The computer 740 may be associated with a control network for satellite 610 and may thereby possess PRN data associated with the spot beam 630.

In operation, the first receiving device 620A initiates a request for authentication data, which is transmitted to the second receiving device 620B. The communication link between the first receiving device 620B may be direct or may be implemented through a transmit network 720. The second receiving device 620B responds to the request and issues a near-simultaneous request for authentication data from the first receiving device 620A. The first receiving device 620A authenticates the second receiving device 620B and issues a near-simultaneous response to for authentication data to the second receiving device 620B, which may then authenticate the first receiving device 620A.

As described above, the authentication process implemented between the first receiving device 620A and the second receiving device 620B may be a Diffie-Hellman exchange in which the shared secret comprises at least a portion of the PRN data transmitted by the spot beam 630. Thus, the system depicted in FIG. 12C enables peer-to-peer authentication of receiving device 620A, 620B. One skilled in the art will recognize that this two-way authentication approach could be extended to a receiving device and a server as well as other hardware architectures, or to more than two devices.

FIG. 13A is a schematic illustration of a computing system which may be adapted to implement a satellite based authentication system, according to embodiments. For example, in the embodiments depicted in FIGS. 12A and 12B the verifier 730 may be implemented by a computing system as depicted in FIG. 13A. Referring to FIG. 13A, in one embodiment, system 800 may include a computing device 808 and one or more accompanying input/output devices including a display 802 having a screen 804, one or more speakers 806, a keyboard 810, one or more other I/O device(s) 812, and a mouse 814. The other I/O device(s) 812 may include a touch screen, a voice-activated input device, a track ball, and any other device that allows the system 800 to receive input from a user.

The computing device 808 includes system hardware 820 and memory 830, which may be implemented as random access memory and/or read-only memory. A file store 880 may be communicatively coupled to computing device 808. File store 880 may be internal to computing device 808 such as, e.g., one or more hard drives, CD-ROM drives, DVD-ROM drives, or other types of storage devices. File store 880 may also be external to computer 808 such as, e.g., one or more external hard drives, network attached storage, or a separate storage network.

System hardware 820 may include one or more processors 822, at least two graphics processors 824, network interfaces 826, and bus structures 828. In one embodiment, processor 822 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 824 may function as adjunct processors that manage graphics and/or video operations. Graphics processors 824 may be integrated onto the motherboard of computing system 800 or may be coupled via an expansion slot on the motherboard.

In one embodiment, network interface 826 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 828 connect various components of system hardware 820. In one embodiment, bus structures 828 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 830 may include an operating system 840 for managing operations of computing device 808. In one embodiment, operating system 840 includes a hardware interface module 854 that provides an interface to system hardware 820. In addition, operating system 840 may include a file system 850 that manages files used in the operation of computing device 808 and a process control subsystem 852 that manages processes executing on computing device 808.

Operating system 840 may include (or manage) one or more communication interfaces that may operate in conjunction with system hardware 820 to transceive data packets and/or data streams from a remote source. Operating system 840 may further include a system call interface module 842 that provides an interface between the operating system 840 and one or more application modules resident in memory 830. Operating system 840 may be embodied as a UNIX operating system or any derivative thereof (e.g., Linux, Solaris, Berkeley Software Distribution (BSD), Android, etc.) or as a Windows® brand operating system, or other operating systems.

In various embodiments, the computing device 808 may be embodied as a personal computer, a laptop computer, a personal digital assistant, a mobile telephone, an entertainment device, or another computing device.

In one embodiment, memory 830 includes an authentication module 862 to authenticate a claimant based on data received from the claimant. In one embodiment, an authentication module 862 may include logic instructions encoded in a non-transitory computer-readable medium which, when executed by processor 822, cause the processor 822 to authenticate a claimant based on data received from the claimant. In addition, memory 830 may comprise a satellite orbit database 864 which includes orbit information for satellites 610 in a predetermined orbit around the earth. Additional details about the authentication process and operations implemented by authentication module 862 are described below.

In some embodiments the receiving device 620 may be implemented as a satellite communication module adapted to couple with a conventional computing device 622 (e.g., a laptop, a PDA, or a smartphone device). The receiving device 620 may be coupled to the computing device 622 by a suitable communication connection, e.g., by a Universal Serial Bus (USB) interface, an RS-232 interface, an optical interface, or the like. In the embodiment depicted in FIG. 13B the receiving device 620 may be a "thin" device in the sense that it may include a receiver and limited processing capability, e.g., an application specific integrated circuit (ASIC) or a field programmable gate array (FPGA) configured to implement an authentication routine.

In operation, a user of the computing device 622 may utilize the receiving device 620 to authenticate the computing device 622 with a host network 890. As described above, the receiving device 620 depicted in FIG. 13B may receive a spot beam transmission 630 from the satellite 610 which includes a distinctive beam signature and a pseudo-random number (PRN). The computing device 622 may initiate an access request to the host network 890. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 610.

The host network 890 may transmit a user access request to the verifier 730 as an authentication request. In some embodiments the host network may add additional information to the request en enable the verifier 730 to authenticate the computer 622. By way of example, the host network 630 may provide limitations regarding where (i.e., from what geographic locations) the claimant may be authenticated). The verifier 730 may verify the claimant and provide an authentication response to the host network 890. The host network 890, in turn, may forward an access response to the computing device 622.

FIG. 14 is a flowchart illustrating operations in a method to authenticate a claimant, according to embodiments. Referring to FIG. 14, at operation 910 a claimant device determines a physical location of the claimant device. In some embodiments a claimant device 620 may comprise one or more location modules to determine a location of the claimant device 620. By way of example and not limitation, claimant device 620 may include, or be communicatively coupled to, a global positioning system (GPS) module to determine a location based on signals from the global positioning system. Alternatively, or in addition, claimant device 620 may include logic to determine a location based on signals from one or more LEO or MEO satellites 610 as described in one or more of U.S. Pat. Nos. 7,489,926, 7,372,400, 7,579,987, and 7,468,696, the disclosures of which are incorporated herein by reference in their respective entireties. In some embodiments the location of the claimant device 620 may be expressed in latitude/longitude coordinates or another earth-based coordinate system.

At operation 915 the claimant device 620 receives a spot beam transmission from a satellite 610. In some embodiments the claimant device 620 extracts one or more distinctive beam parameters (e.g., time, satellite ID, beam ID, time bias, satellite orbit data, etc.) including a pseudo random code segment from the satellite spot beam. In some embodiments the claimant device 620 may store the beam parameters in a memory module in, or communicatively coupled to, the claimant device 620. In one or more embodiments operation 915 may occur near simultaneously to its preceding operation 910.

At operation 920 the claimant device 620 may continue to generate one or more waypoint data snapshots which may include the location information for the claimant device 620 from operation 910, and one or more of the distinctive beam parameters transmitted via the satellite spot beam as noted in operation 920. In some embodiments the waypoint data snapshots may be stored in a memory module in, or communicatively coupled to, the claimant device 620.

In some embodiments the claimant device 620 may collect an array of waypoint data snapshots over time. For example, an array of waypoint data snapshots may be constructed by receiving spot beams from a plurality of satellites 610 passing over the claimant device 620 over time. Alternatively, or in addition, an array of waypoint data snapshots may be constructed by moving the claimant device 620 in relation to the satellites 610, for example, by placing the claimant device 620 in an aircraft 625 as depicted in FIG. 12B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 920 the waypoint data snapshot(s) are transferred from the claimant device 620 to a verifier device 730. By way of example, in the embodiment depicted in FIG. 12A the waypoint data snapshot(s) may be transmitted via a transmitter 720 or by another communication network. In the embodiment depicted in FIG. 12B the waypoint data snapshot(s) may be transmitted from the aircraft 625 to a satellite 610, then may be transmitted via a satellite network to a verifier device 730.

At operation 925 the verifier device 730 receives location data and waypoint data from the claimant device 620. At operation 930 the verifier device 730 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 730 may include a satellite orbit database 864, or be communicatively coupled to a satellite orbit database 864, which includes orbit information about satellites 610 in a known orbit about the earth.

In some embodiments the location data and waypoint data received from the claimant device is compared (operation 930) with location and waypoint data from the known data set to determine whether the claimant device 620 is, in fact, within a reasonable threshold distance of an expected geographic location at an expected time. By way of example and not limitation, the satellite orbit database 864 may be searched for a data record corresponding to the distinctive beam parameters transmitted from the claimant device 620. When a matching record is located, the orbit data from the record retrieved from the orbit database 864 may be compared to the data received from the claimant device 620. For example, the known data may comprise a coordinate for the center of the spot beam 630 and an indication of the radius of the spot beam 630 on the surface of the earth. The coordinates received from the claimant device 620 may be compared to the location of the spot beam to determine whether the received data indicates that the claimant device 620 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 935, the data received from the claimant device 620 indicates that the claimant device 620 is within a geographic region encompassed by the spot beam from the satellite 610 at the time associated with the data from the claimant device, then the claimant device 620 may be considered authenticated. In an authentication system, control then passes to operation 940 and the claimant is allowed to access a resource. By way of example and not limitation, the verifier device 730 may grant a token to an authenticated claimant device 620. The token may be used by a remote system to grant access to a resource.

By contrast, if the data received from the claimant device 620 indicates that the claimant device 620 is not within a geographic region encompassed by the spot beam from the satellite 610 at the time associated with the data from the claimant device 620, then the claimant device 620 may not be considered authenticated. In an authentication system, control then passes to operation 945 and the claimant is denied access to a resource. By way of example and not limitation, the verifier device 730 may deny a token to an authenticated claimant device 620. In the absence of a token the claimant device may be denied access to a resource managed by a remote system.

Thus, the system architecture depicted in FIGS. 11-13 and the method depicted in FIG. 14 enable satellite-based authentication of one or more claimant device(s) 620. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 620 are authenticated to use a resource for an entire session. In other embodiments the system may implement message-based authentication in which the claimant device(s) 620 must be authenticated separately for each message transmitted from the claimant device(s) 620 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 620. During the course of a scheduled mission a logistics system may periodically poll the claimant device(s) 620, which may respond with authentication data obtained from the satellite 610. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e., the claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 610 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 610). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method to improve routing security, the method comprising:
   assigning, by at least one processor, at least one level of trust to at least one network node; and
   utilizing, by the at least one processor, the at least one level of trust to determine a degree of security of the at least one network node,
   wherein the at least one level of trust of the at least one network node is related to an amount of certainty of a physical location of the at least one network node that is attained from verification of the physical location by using satellite geolocation techniques, which use liveness information from at least one secure spot beam based authentication signal to derive at least one secret key, in order to obtain the physical location of the at least one network node.

2. The method of claim 1, wherein the at least one level of trust of the at least one network node is at least one of very high, high, medium, and low.

3. The method of claim 1, wherein the amount of certainty of the physical location of the at least one network node is alternatively attained from the at least one network node being located in a known secure location.

4. The method of claim 1, wherein the at least one secure authentication signal is transmitted by at least one transmission source, and is received by at least one receiving source associated with the at least one network node.

5. The method of claim 4, wherein the at least one transmission source is employed in at least one of at least one satellite and at least one pseudo-satellite.

6. The method of claim 5, wherein the at least one satellite is at least one of a Lower Earth Orbiting (LEO) satellite, a Medium Earth Orbiting (MEO) satellite, and a Geosynchronous Earth Orbiting (GEO) satellite.

7. The method of claim 6, wherein the LEO satellite is an Iridium LEO satellite.

8. The method of claim 1, wherein the amount of certainty of the physical location of the at least one network node is alternatively attained from estimating the physical location of the at least one network node by using network ping ranging measurements.

9. The method of claim 8, wherein the network ping ranging measurements are obtained from an amount of time lapsed during ping messages being sent back and forth from at least one verified node with a verified physical location to the at least one network node.

10. The method of claim 9, wherein the at least one verified node with a verified physical location has its physical location verified by satellite geolocation techniques.

11. The method of claim 1, wherein the method further comprises:
   utilizing the at least one level of trust of the at least one network node to determine a degree of trust of at least one path for routing the data, wherein the at least one path includes at least one of the at least one network node.

12. The method of claim 11, wherein the degree of trust of the at least one path is one of very high, high, medium and low.

13. The method of claim 11, wherein the degree of trust of the at least one path is equal to the lowest level of trust assigned to the at least one of the at least one network node in the at least one path.

14. The method of claim 11, wherein the method further comprises:
choosing which of the at least one path to route the data through according to the degree of trust of the at least one path.

15. The method of claim 1, wherein the method further comprises:
encrypting, with at least one processor, the data;
transmitting, with one of the at least one network node, the encrypted data;
receiving, with another one of the at least one network node, the encrypted data; and
decrypting, with the at least one processor, the encrypted data.

16. The method of claim 1, wherein the method further comprises:
utilizing, by at least one of the at least one network node, at least one secure router to transmit the data.

17. The method of claim 1, wherein the method further comprises:
utilizing, by at least one of the at least one network node, at least one secure router to receive the data.

18. The method of claim 1, wherein the method further comprises:
utilizing, by at least one of the at least one network node, at least one boundary firewall router to determine whether data is allowed through the at least one boundary firewall router based on a degree of trust of a path the data has traveled through.

19. The method of claim 11, wherein at least one of the at least one path includes at least one secure autonomous system for routing the data through.

20. The method of claim 1, wherein the method further comprises:
generating, with at least one processor, a mapping of the physical location of the at least one network node, wherein the mapping indicates the at least one level of trust for each of the at least one network node.

21. The method of claim 1, wherein the at least one level of trust of the at least one network node is related to a behavior of the at least one network node.

22. The method of claim 21, wherein the behavior of the at least one network node is related to at least one of the data passing through the at least one network node and a quantity of the data passing through the at least one network node.

23. A system to improve routing security, the system comprising:
at least one network node; and
at least one processor configured to assign at least one level of trust to the at least one network node, and configured to utilize the at least one level of trust to determine a degree of security of the at least one network node,
wherein the at least one level of trust of the at least one network node is related to an amount of certainty of a physical location of the at least one network node that is attained from verification of the physical location by using satellite geolocation techniques, which use liveness information from at least one secure spot beam based authentication signal to derive at least one secret key, in order to obtain the physical location of the at least one network node.

* * * * *